(12) United States Patent
Nakamura et al.

(10) Patent No.: US 9,971,012 B2
(45) Date of Patent: May 15, 2018

(54) SOUND DIRECTION ESTIMATION DEVICE, SOUND DIRECTION ESTIMATION METHOD, AND SOUND DIRECTION ESTIMATION PROGRAM

(71) Applicant: HONDA MOTOR CO., LTD., Tokyo (JP)

(72) Inventors: Keisuke Nakamura, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 685 days.

(21) Appl. No.: 14/023,622

(22) Filed: Sep. 11, 2013

(65) Prior Publication Data
US 2014/0078867 A1    Mar. 20, 2014

(30) Foreign Application Priority Data
Sep. 14, 2012 (JP) ................. 2012-203393

(51) Int. Cl.
*G01S 3/80* (2006.01)
*G01S 3/802* (2006.01)

(52) U.S. Cl.
CPC ............ *G01S 3/802* (2013.01); *G01S 3/8006* (2013.01)

(58) Field of Classification Search
USPC ......................................... 367/118
See application file for complete search history.

(56) References Cited

U.S. PATENT DOCUMENTS 8,120,993 B2 *  2/2012  Amada ................. G01S 3/8034
                                                       367/118
8,693,287 B2 *  4/2014  Nakadai ............... G01S 3/8006
                                                       367/124
(Continued)

FOREIGN PATENT DOCUMENTS

JP    H11-231033 A    8/1999
JP    2001-091617 A   4/2001
(Continued)

OTHER PUBLICATIONS

Manoochchr Azmoodeh. Abstract Data Types and Algorithms. 2nd Edition. Publisher Springer. ISBN 1349211516, 9781349211517. 377 pages. 1990.*
(Continued)

*Primary Examiner* — Isam A Alsomiri
*Assistant Examiner* — Jonathan D Armstrong
(74) *Attorney, Agent, or Firm* — Squire Patton Boggs (US) LLP

(57) ABSTRACT

A sound direction estimation device includes a transfer function storage unit configured to store transfer functions of sound sources in correlation with directions of the sound sources, a calculation unit configured to calculate the number of classes to be searched and a search interval for each class based on a desired search range and a desired spatial resolution for searching for the directions of the sound sources, and a sound source localization unit configured to search the search range for every search interval using the transfer function, to estimate the direction of the sound source based on the search result, to update the search range and the search interval based on the estimated direction of the sound source until the number of classes calculated by the calculation unit is reached, and to estimate the direction of the sound source.

5 Claims, 13 Drawing Sheets

(56) References Cited

U.S. PATENT DOCUMENTS

| | | | |
|---|---|---|---|
| 2004/0091119 A1* | 5/2004 | Duraiswami | H04S 1/002 381/26 |
| 2007/0092016 A1* | 4/2007 | Cheng | H04L 27/2601 375/260 |
| 2011/0025563 A1 | 2/2011 | Ferreol et al. | |

FOREIGN PATENT DOCUMENTS

| | | |
|---|---|---|
| JP | 2005-201798 A | 7/2005 |
| JP | 2006-292660 A | 10/2006 |
| JP | 2012-042465 A | 3/2012 |

OTHER PUBLICATIONS

Roy, Deb K. "Speaker indexing using neural network clustering of vowel spectra." International Journal of Speech Technology 1.2 (1997): 143-149.*

Duraiswami, Rainani, Dmitry Zotkin, and Larry S. Davis. "Active speech source localization by a dual coarse-to-fine search." Acoustics, Speech, and Signal Processing, 2001. Proceedings. (ICASSP'01). 2001 IEEE International Conference on. vol. 5. IEEE, 2001.*

Parra, Lucas C., and Christopher V. Alvino. "Geometric source separation: Merging convolutive source separation with geometric beamforming." Speech and Audio Processing, IEEE Transactions on 10.6 (2002): 352-362.*

Ringach, Dario L. "Look at the big picture (details will follow)." nature neuroscience 6.1 (2003): 7-8.*

Zotkin, Dmitry N., and Ramani Duraiswami. "Accelerated speech source localization via a hierarchical search of steered response power." Speech and Audio Processing, IEEE Transactions on 12.5 (2004): 499-508.*

Valin, Jean-Marc, et al. "Robust recognition of simultaneous speech by a mobile robot." Robotics, IEEE Transactions on 23.4 (2007): 742-752.*

Yamamoto, Shunnichi, et al. "Design and implementation of a robot audition system for automatic speech recognition of simultaneous speech." Automatic Speech Recognition & Understanding, 2007. ASRU. IEEE Workshop on. IEEE, 2007.*

Nakajima, Hirofumi, et al. "Adaptive step-size parameter control for real-world blind source separation." Acoustics, Speech and Signal Processing, 2008. ICASSP 2008. IEEE International Conference on. IEEE, 2008.*

Nakadai, Kazuhiro, et al. "Sound source separation of moving speakers for robot audition." Acoustics, Speech and Signal Processing, 2009. ICASSP 2009. IEEE International Conference on. IEEE, 2009.*

Nakadai, Kazuhiro, et al. "Design and Implementation of Robot Audition System 'HARK'—Open Source Software for Listening to Three Simultaneous Speakers." Advanced Robotics 24.5-6 (2010): 739-761.*

Asano, Futoshi, and Hideki Asoh. "Joint estimation of sound source location and noise covariance in spatially colored noise." Proc. Eusipco 2011 (2011).*

Nakamura, Keisuke, et al. "Intelligent sound source localization and its application to multimodal human tracking." Intelligent Robots and Systems (IROS), 2011 IEEE/RSJ International Conference on. IEEE, 2011.*

Nakamura, Keisuke, et al. "Correlation matrix interpolation in sound source localization for a robot." Acoustics, Speech and Signal Processing (ICASSP), 2011 IEEE International Conference on. IEEE, 2011.*

Nakadai, Kazuhiro, et al. "Robot audition for dynamic environments." Signal Processing, Communication and Computing (ICSPCC), 2012 IEEE International Conference on. IEEE, 2012.*

Nakamura, Keisuke, Kazuhiro Nakadai, and Gökhan Ince. "Real-time super-resolution sound source localization for robots." Intelligent Robots and Systems (IROS), 2012 IEEE/RSJ International Conference on. IEEE, 2012.*

Okutani, Keita, et al. "Outdoor auditory scene analysis using a moving microphone array embedded in a quadrocopter." Intelligent Robots and Systems (IROS), 2012 IEEE/RSJ International Conference on. IEEE, 2012.*

Nakamura, Keisuke, Kazuhiro Nakadai, and Hiroshi G. Okuno. "A real-time super-resolution robot audition system that improves the robustness of simultaneous speech recognition." Advanced Robotics 27.12 (2013): 933-945.*

Ohata, Takuma, et al. "Improvement in outdoor sound source detection using a quadrotor-embedded microphone array." Intelligent Robots and Systems (IROS 2014), 2014 IEEE/RSJ International Conference on. IEEE, 2014.*

Okuno, Hiroshi G., and Kazuhiro Nakadai. "Robot audition: Its rise and perspectives." Acoustics, Speech and Signal Processing (ICASSP), 2015 IEEE International Conference on. IEEE, 2015.*

Takeda, Ryu, and Kazunori Komatani. "Performance comparison of Music-based sound localization methods on small humanoid under low SNR conditions." Humanoid Robots (Humanoids), 2015 IEEE-RAS 15th International Conference on. IEEE, 2015.*

Matsumoto, Mitsuo, Mikio Tohyama, and Hirofumi Yanagawa. "A method of interpolating binaural impulse responses for moving sound images." Acoustical Science and Technology 24.5 (2003): 284-292.*

Japanese Office Action Notice of Reasons for Rejection application No. 2012-203393 dated Oct. 20, 2015.

* cited by examiner

| SAMPLING FREQUENCY | 16[kHz] |
|---|---|
| FFT SCORE | 512 |
| SHIFT LENGTH | 160 |
| NUMBER OF MICROPHONES | 8 |
| ARRAY SHAPE | CIRCULAR ARRAY |
| NUMBER OF SPEAKERS | 4 |
| SPEAKER DISTANCE | 1.5[m] |
| ROOM SIZE | 7×4[m] |
| REVERBERATION TIME | 0.2[sec] (RT20) |

|  | 1 src | 2 srcs | 3 srcs | 4 srcs |
|---|---|---|---|---|
| NON-CLASSIFIED | 24.1ms | 22.0ms | 19.6ms | 17.5ms |
| CLASSIFIED | 6.8ms | 7.7ms | 8.3ms | 8.7ms |

SOUND DIRECTION ESTIMATION DEVICE, SOUND DIRECTION ESTIMATION METHOD, AND SOUND DIRECTION ESTIMATION PROGRAM

CROSS REFERENCE TO RELATED APPLICATIONS

Priority is claimed on Japanese Patent Application No. 2012-203393, filed on Sep. 14, 2012, the contents of which are entirely incorporated herein by reference.

BACKGROUND OF THE INVENTION

Field of the Invention

The present invention relates to a sound direction estimation device, a sound direction estimation method, and a sound direction estimation program.

Description of Related Art

Techniques of recognizing uttered speech from sound signals generated from sound sources have been proposed. In such speech recognition, noise signals are separated from the sound signals or the noise signals are suppressed, and a target sound signal to be recognized is extracted from the sound signals. For example, speech recognition is performed on the extracted sound signal. In such a system, in order to extract speech to be recognized, the directions in which the sound signals are generated should be known or the directions in which the sound signals are generated should be estimated.

For example, in Japanese Unexamined Patent Application, First Publication No. 2012-42465 (Patent Document 1), a type of sound source of an input sound signal is identified based on a sound feature value of the sound signal and a sound direction of the identified type of sound source of the sound signal is estimated. In Patent Document 1, a GEVD (Generalized Eigenvalue Decomposition)-MUSIC method or a GSVD (Generalized Singular Value Decomposition)-MUSIC method is used to estimate information of the sound direction (hereinafter, also referred to as sound source localization). In this way, when the GEVD-MUSIC or the GSVD-MUSIC method is used, computation efficiency of sound source localization in a sound source estimating device is enhanced.

SUMMARY OF THE INVENTION

However, in such a sound source estimating device, transfer functions correlated with sound directions are acquired in advance through measurement or calculation in a range in which the sound directions are searched for and are stored in the device. In such a sound source estimating device, spatial spectrums are calculated using the transfer functions stored in the storage unit and sound directions are calculated based on the calculated spatial spectrums. Accordingly, in order to enhance estimation accuracy of a sound direction, transfer functions correlated with multiple sound directions are necessary. Therefore, in the sound source estimating device according to the related art, there is a problem in that a large computational load is required for enhancing the estimation accuracy of a sound direction and thus computation efficiency is low.

The present invention is made in consideration of the above-mentioned circumstances, and an object thereof is to provide a sound direction estimation device, a sound direction estimation method, and a sound direction estimation program which can enhance processing efficiency in estimation of a sound direction.

(1) In order to achieve the above-mentioned object, according to an aspect of the present invention, a sound direction estimation device is provided including: a transfer function storage unit configured to store transfer functions of sound sources in correlation with directions of the sound sources; a calculation unit configured to calculate the number of classes to be searched and a search interval for each class based on a desired search range and a desired spatial resolution for searching for the directions of the sound sources; and a sound source localization unit configured to search the search range for every search interval using the transfer function, to estimate the direction of the sound source based on the search result, to update the search range and the search interval based on the estimated direction of the sound source until the number of classes calculated by the calculation unit is reached, and to estimate the direction of the sound source.

(2) According to another aspect of the present invention, in the sound direction estimation device, the sound source localization unit may be configured to search an n-th class (where n is an integer greater than or equal to 1) in the predetermined search range with the calculated search interval and update at least one search interval in the search range to the search range of an (n+1)-th class based on the search result, to update the search interval of the (n+1)-th class to be searched based on the updated search range of the (n+1)-th class and the desired spatial resolution, and to update and estimate the directions of the sound sources using the updated search range of the (n+1)-th class, the updated search interval of the (n+1)-th class, and the transfer function corresponding to an azimuth of the search interval until the number of classes (n+1) reaches the number of classes calculated by the calculation unit.

(3) According to another aspect of the present invention, in the sound direction estimation device, the calculation unit may be configured to calculate the number of classes and the search interval so that a search number for each class is constant in all the classes.

(4) According to another aspect of the present invention, in the sound direction estimation device, the calculation unit may be configured to calculate the number of classes and the search interval so as to minimize the total search number in all the classes.

(5) According to another aspect of the present invention, in the sound direction estimation device, the sound source localization unit may be configured to determine whether the transfer function corresponding to the azimuth of the search interval is stored in the transfer function storage unit, to read the transfer function corresponding to the azimuth of the search interval from the transfer function storage unit when it is determined that the transfer function corresponding to the azimuth of the search interval is stored in the transfer function storage unit, to calculate an interpolated transfer function by interpolating the transfer function corresponding to the azimuth of the search interval when it is determined that the transfer function corresponding to the azimuth of the search interval is not stored in the transfer function storage unit, and to estimate the directions of the sound sources using the read transfer function or the calculated interpolated transfer function.

(6) According to another aspect of the present invention, in the sound direction estimation device, the calculation unit may be configured to calculate the number of classes and the search interval so as to minimize a calculation cost which is a sum of a search cost spent in calculating the search number in the search range and an interpolation cost spent in the interpolation.

(7) According to another aspect of the present invention, a sound direction estimation method in a sound direction estimation device is provided, including: calculating the number of classes to be searched and a search interval for each class based on a desired search range and a desired spatial resolution for searching for a direction of a sound source; searching the search range for every search interval using a transfer function from the sound source stored in a transfer function storage unit in correlation with the direction of the sound source and estimating the direction of the sound source based on the search result; and updating the search range and the search interval based on the estimated direction of the sound source until the calculated number of classes calculation unit is reached and estimating the direction of the sound source.

(8) According to another aspect of the present invention, a sound direction estimation program is provided causing a computer of a sound direction estimation device to perform: calculating the number of classes to be searched and a search interval for each class based on a desired search range and a desired spatial resolution for searching for a direction of a sound source; searching the search range for every search interval using a transfer function from the sound source stored in a transfer function storage unit in correlation with the direction of the sound source and estimating the direction of the sound source based on the search result; and updating the search range and the search interval based on the estimated direction of the sound source until the calculated number of classes calculation unit is reached and estimating the direction of the sound source.

According to Aspects (1), (2), (7), and (8) of the present invention, since the calculation unit calculates the number of classes to be searched and the search interval for each class based on the desired search range and the desired spatial resolution used to search for directions of sound sources, it is possible to reduce the processing time to be spent in estimating the directions of sound sources.

According to Aspects (3) and (4) of the present invention, since the calculation unit can calculate the number of classes to be searched and the search interval for each class with a small computational load, it is possible to reduce the processing time to be spent in estimating the directions of sound sources.

According to Aspect (5) of the present invention, since the sound source localization unit estimates the directions of the sound sources using an interpolated transfer function obtained by interpolating a transfer function when the transfer function corresponding to the azimuth to be searched for is not stored in the transfer function storage unit and using a read transfer function when the transfer function corresponding to the azimuth to be searched for is stored in the transfer function storage unit, it is possible to accurately estimate the directions of the sound sources.

According to Aspect (6) of the present invention, since the sound source localization unit calculates the number of classes and the search interval so that the calculation cost which is the sum of the search cost spent in calculating the search number and the interpolation cost spent in the interpolation, it is possible to reduce the processing time to be spent in estimating the directions of sound sources.

DETAILED DESCRIPTION OF THE INVENTION

Hereinafter, embodiments of the present invention will be described in detail. The present invention is not limited to the embodiments and can be modified in various forms without departing from the technical spirit thereof.

First Embodiment

First, a summary of this embodiment will be described below.

Figure 1:
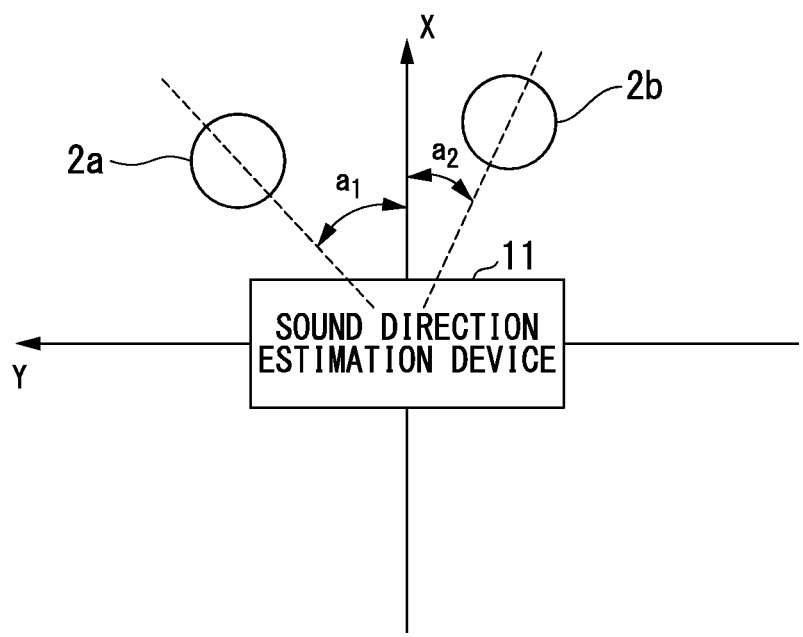
FIG. 1 is a diagram illustrating an environment in which a direction of a sound source is estimated.

FIG. 1 is a diagram illustrating an environment in which directions of sound sources are estimated (hereinafter, referred to as sound direction estimation). In FIG. 1, the left-right direction in the drawing page is set as a Y direction and a direction perpendicular to the Y direction is defined as an X direction. Reference signs 2a and 2b represent sound sources. A sound direction estimation device (sound direction estimation unit) 11 according to this embodiment performs sound source localization and sound source separation to recognize multiple sound sources. In the example shown in FIG. 1, the sound source 2a is located in the direction of an angle $a_1$ in the counterclockwise direction about the X axis and the sound source 2b is located in the direction of an angle $a_2$ in the clockwise direction about the X axis.

Figure 2:
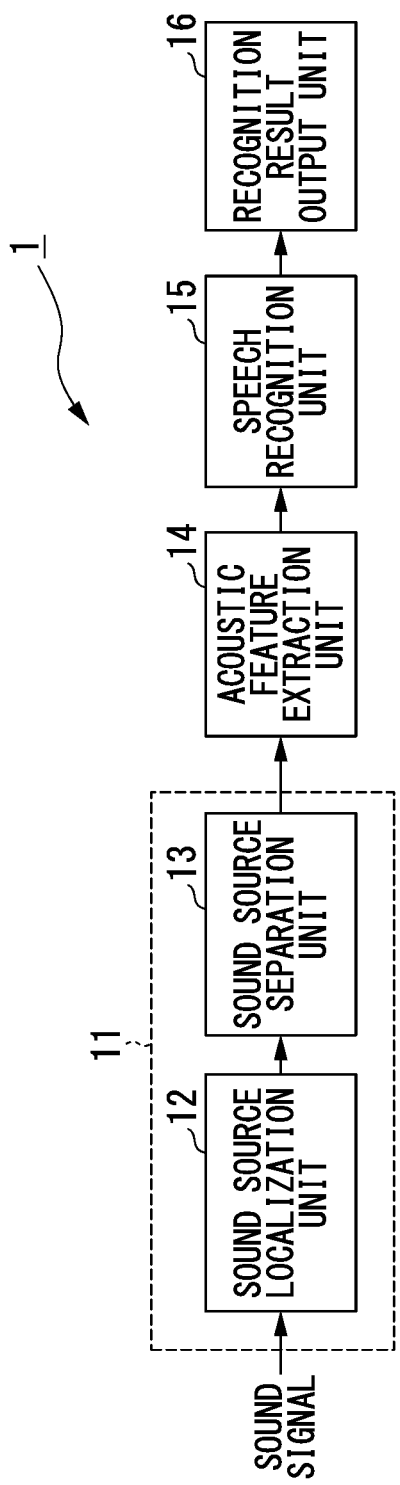
FIG. 2 is a diagram schematically illustrating processes in a sound processing system according to a first embodiment of the present invention.

FIG. 2 is a diagram schematically illustrating processes in a sound processing system 1 according to this embodiment. As shown in FIG. 2, the sound processing system 1 includes a sound direction estimation unit 11, an acoustic feature extraction unit 14, an automatic speech recognition unit 15, and a recognition result output unit 16. The sound direction estimation unit 11 includes a sound source localization unit 12 and a sound source separation unit 13.

The sound source localization unit 12 includes a sound signal input unit and performs, for example, Fourier transform on sound signals collected by multiple microphones. The sound source localization unit 12 estimates a sound direction in multiple sound signals subjected to Fourier transform (hereinafter, referred to as "sound source localization"). The sound source localization unit 12 outputs information indicating the result of sound source localization to the sound source separation unit 13.

The sound source separation unit 13 separates a target sound and noise based on the information indicating the result of sound source localization which is input from the sound source localization unit 12. The sound source separation unit 13 outputs signals corresponding to the separated sound sources to the acoustic feature extraction unit 14. The target sound is, for example, speeches uttered by multiple speakers. The noise is sounds such as wind noise and a sound generated from equipment located in the sound-collected room.

The acoustic feature extraction unit 14 extracts acoustic features of the signals corresponding to the sound sources input from the sound source separation unit 13 and outputs information indicating the extracted acoustic features to the automatic speech recognition unit 15.

When speech uttered by a person is included in the sources, the automatic speech recognition unit 15 recognizes the speech based on the acoustic features input from the acoustic feature extraction unit 14 and outputs the recognition result to the recognition result output unit 16.

The recognition result output unit 16 is, for example, a display or a sound signal output device. The recognition result output unit 16 displays information based on the recognition result input from the automatic speech recognition unit 15, for example, on a display unit.

The sound processing system 1 or the sound direction estimation unit 11 may be mounted on, for example, a robot, a vehicle, an aircraft (including a helicopter), and a mobile terminal. Examples of the mobile terminal include a mobile phone terminal, a portable information terminal, and a portable game terminal.

In this embodiment, a sound direction is hierarchically estimated to reduce calculation costs while enhancing a spatial resolution of a sound source to improve estimation accuracy of a sound direction. In hierarchical estimation of a sound source, the sound direction estimation unit 11 (FIG. 2) divides a predetermined search range into coarse intervals and searches the coarse search intervals to estimate the sound direction. Then, the sound direction estimation unit 11 selects one search interval corresponding to the estimated direction and sets the selected search interval as a new search range. Then, the sound direction estimation unit 11 divides the new search range into finer search intervals and estimates a sound direction by searching the finer search intervals. In this way, in this embodiment, the search is carried out, for example, by setting a next search interval to be narrower than a current search interval. As a result, in this embodiment, it is possible to reduce the processing time to be spent in estimating a sound direction.

Figure 3:
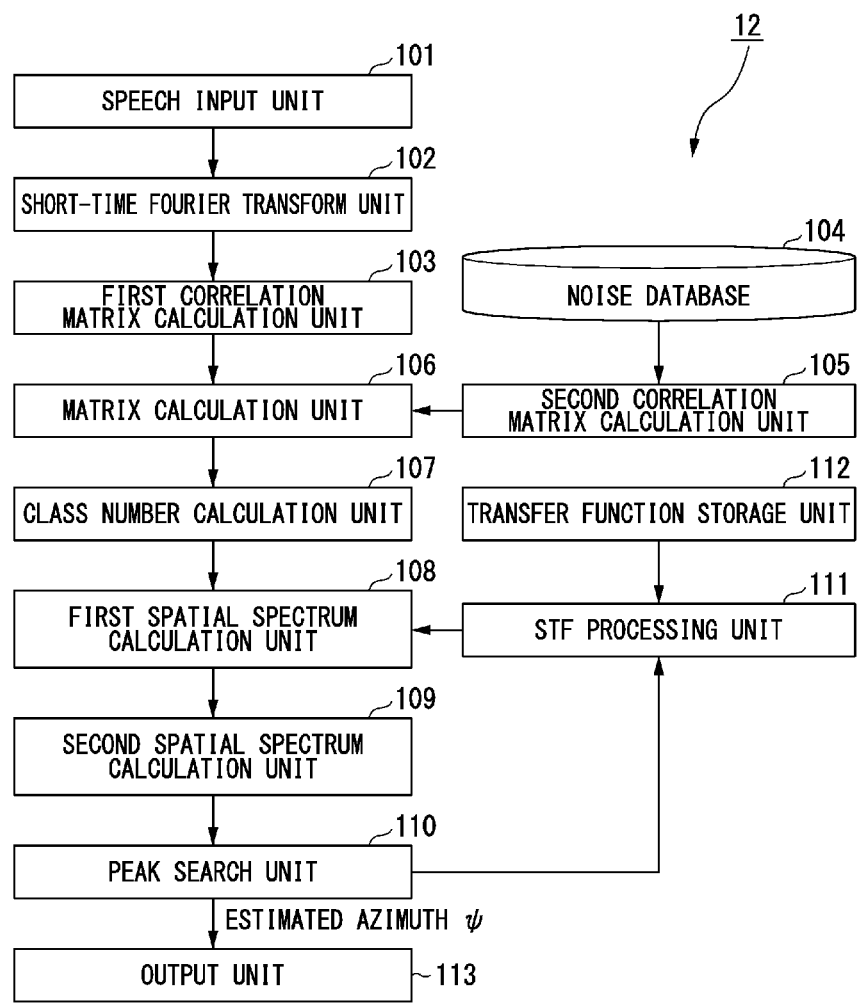
FIG. 3 is a block diagram illustrating a sound source localization unit in the first embodiment.

FIG. 3 is a block diagram illustrating a sound source localization unit 12 in this embodiment.

As shown in FIG. 3, the sound source localization unit 12 includes a sound input unit 101, a short-time Fourier transform unit 102, a first correlation matrix calculation unit 103, a noise database 104, a second correlation matrix calculation unit 105, a matrix calculation unit 106, a class number calculation unit 107, a first spatial spectrum calculation unit 108, a second spatial spectrum calculation unit 109, a peak search unit 110, a spatial transfer function (STF) processing unit 111, a transfer function storage unit 112, and an output unit 113.

The sound input unit 101 includes M (where M is an integer equal to or more than 2) sound input means (for example, microphones) and the sound input means are arranged at different positions. The sound input unit 101 is, for example, a microphone array including M microphones. The sound input unit 101 outputs sound waves received by the sound input means as a sound signal of each channel to the short-time Fourier transform unit 102. The sound input unit 101 may convert a sound signal from an analog signal to a digital signal and may output the sound signal converted into the digital signal to the short-time Fourier transform unit 102.

The short-time Fourier transform unit 102 performs short-time Fourier transform (STFT) on the sound signal of each channel input from the sound input unit 101 for each frame in the time domain to generate an input signal in the frequency domain. The short-time Fourier transform is an operation of performing a Fourier transform by multiplying a function by a window function while shifting the window function. The frame is a time interval of a predetermined length (frame length) or a signal included in the time interval. The frame length is, for example, 10 [msec].

The short-time Fourier transform unit 102 generates a matrix $X(\omega, f)$ for each frequency $\omega$ and each frame time f using the input signal subjected to the short-time Fourier transform for each frame, and outputs the generated input vector $X(\omega, f)$ of M columns to the first correlation matrix calculation unit 103.

The first correlation matrix calculation unit 103 calculates a spatial correlation matrix $R(\omega, f)$ for each frequency $\omega$ and each frame time f using the input vector $X(\omega, f)$ input from the short-time Fourier transform unit 102 and using Expression (1). The first correlation matrix calculation unit 103 outputs the calculated spatial correlation matrix $R(\omega, f)$ to the matrix calculation unit 106. The spatial correlation matrix $R(\omega, f)$ is a square matrix of M rows and M columns.

$$R(\omega, f) = \frac{1}{T_R} \sum_{\tau=0}^{T_R-1} X(\omega, f+\tau) X^*(\omega, f+\tau) \quad (1)$$

In Expression (1), f represents a current frame time and $T_R$ represents a length of a section (number of frames) used to calculate the spatial correlation matrix $R(\omega, f)$. This length of a section is called a window length. $\tau$ is a parameter indicating a frame time (not limited to the current frame time) and has a value in a range of 0 to $T_R-1$. In addition, * represents a complex conjugate transposition operator of a vector or a matrix. In Expression (1), the spatial correlation matrix $R(\omega, f)$ is smoothed with a $T_R$ frame so as to improve robustness to noise. That is, Expression (1) is an inter-channel correlation between channel n (where n is an integer greater than or equal to 1) and channel m (where m is an integer greater than or equal to 1 and different from n) and is a value obtained by averaging products of an input signal vector of channel n and a complex conjugate of an input signal vector of channel k over a section with a window length $T_R-1$ from the current frame time 0.

A matrix $N(\omega, f)$ of a noise source (hereinafter, referred to as a noise matrix) for each frequency $\omega$ and each frame time f is stored in advance in the noise database 104. Noise is, for example, window noise or a sound generated from equipment located in the sound-collected room other than a target sound.

The second correlation matrix calculation unit 105 reads a noise matrix N(ω, f) stored in the noise database 104 and calculates a correlation matrix K(ω, f) of noise (hereinafter, referred to as noise correlation matrix) for each frequency ω and each frame time f using the read N(ω, f) and Expression (2). The noise correlation matrix K(ω, f) is a noise correlation matrix calculated from a signal to be suppressed (whitened) at the time of localization, but is a unit matrix for the purpose of simplification in this embodiment. The second correlation matrix calculation unit 105 outputs the calculated noise correlation matrix K(ω, f) to the matrix calculation unit 106.

$$K(\omega, f) = \frac{1}{T_k} \sum_{\tau_k=0}^{T_k-1} N(\omega, f + \tau_k) N^*(\omega, f + \tau_k) \quad (2)$$

In Expression (2), $T_k$ represents a length of a section (number of frames) used to calculate the noise correlation matrix K(ω, f). $\tau_k$ is a parameter indicating a frame time (not limited to a current frame time) and has a value in a range of 0 to $T_k-1$. N* represents a complex conjugate transposition operator of a matrix N. As shown in Expression (2), the noise correlation matrix K(ω, f) is an inter-channel correlation between a noise signal of channel n and a noise signal of channel m and is a value obtained by averaging products of the noise matrix N of channel n and a complex conjugate of the noise matrix N of channel k over a section with a window length $T_k-1$ from the current frame time 0.

The matrix calculation unit 106 calculates eigenvectors for each frequency ω and each frame time f in a space in which the spatial correlation matrix R(ω, f) input from the first correlation matrix calculation unit 103 extends using the noise correlation matrix K(ω, f) input from the second correlation matrix calculation unit 105. The matrix calculation unit 106 outputs the calculated eigenvectors to the class number calculation unit 107.

The matrix calculation unit 106 performs a computing operation on a matrix $K^{-1}(\omega, f)R(\omega, f)$, which is obtained by multiplying an inverse matrix $K^{-1}(\omega, f)$ of the noise correlation matrix K(ω, f) by the spatial correlation matrix R(ω, f) from the left side, using a generalized singular-value decomposition (GSVD)-MUSIC method expressed by Expression (3). The matrix calculation unit 106 calculates a vector $E_l(\omega, f)$ and an eigenvalue matrix Λ(ω, f) satisfying the relationship of Expression (3) using the GSVD-MUSIC method. The matrix calculation unit 106 decomposes a space into a partial space of a target sound and a partial space of noise through this process. In this embodiment, it is possible to whiten noise using Expression (3).

$$K^{-1}(\omega,f)R(\omega,f) = E_l(\omega,f)\Lambda(\omega,f)E_r^*(\omega,f) \quad (3)$$

In Expression (3), the vector $E_l(\omega, f)$ is the left-singular vector and the vector $E_r^*(\omega, f)$ is the complex conjugate of the right-singular vector. The vector E(ω, f) is a vector having eigenvectors $e_1(\omega, f), \ldots, e_M(\omega, f)$ as element values. The eigenvectors $e_1(\omega, f), \ldots, e_M(\omega, f)$ are eigenvectors corresponding to eigenvalues $\lambda_1(\omega, f), \ldots, \lambda_M(\omega, f)$. M represents the number of microphones.

The eigenvalue matrix Λ(ω, f) is expressed by Expression (4). In Expression (4), "diag" represents a diagonal matrix.

$$\Lambda(\omega,f) = \mathrm{diag}(\lambda_1(\omega,f), \ldots, \lambda_M(\omega,f)) \quad (4)$$

As described later, the class number calculation unit 107 calculates the number of classes in which the first spatial spectrum calculation unit 108 to the STF processing unit 111 perform estimation and a search interval used for the search, and outputs the calculated number of classes and the calculated search interval and the eigenvectors input from the matrix calculation unit 106 to the first spatial spectrum calculation unit 108. This search interval corresponds to a spatial resolution.

The first spatial spectrum calculation unit 108 calculates a spatial spectrum P(ω, ψ, f) before the frequency ω is integrated for each frequency ω and each sound direction ψ for every frame f using the number of classes and the search interval input from the class number calculation unit 107, the eigenvectors, and transfer function A or the interpolated transfer function Â input from the STF processing unit 111 and using Expression (5). The first spatial spectrum calculation unit 108 performs the computing operation using the interpolated transfer function Â instead of the transfer function A of Expression (5), when the interpolated transfer function Â is input from the STF processing unit 111.

The first spatial spectrum calculation unit 108 the calculated spatial spectrum P(ω, ψ, f) and the number of classes input from the class number calculation unit 107 to the second spatial spectrum calculation unit 109.

$$P(\omega, \psi, f) = \frac{|A^*(\omega, \psi)A(\omega, \psi)|}{\sum_{m=L_s+1}^{M} |A^*(\omega, \psi)e_m(\omega, f)|} \quad (5)$$

In Expression (5), | . . . | represents the absolute value. In Expression (5), the spatial spectrum represents a ratio of a component based on noise to the entire transfer function. In Expression (5), $e_m(\omega, f)$ represents the left-singular vector $E_l(\omega, f)$ ($=e_1(\omega, f), \ldots e_M(\omega, f)$) of Expression (3). A* represents the complex conjugate of a transfer function A. $L_S$ represents the number of sound sources and is an integer equal to or more than 0. A(ω, ψ) represents a known transfer function stored in advance in the transfer function storage unit 112 and is expressed by Expression (6).

$$A(\omega,\psi_i) = [(A_i(\omega,\psi_i), \ldots, A_M(\omega,\psi_i))]^T \quad (6)$$

Here, $\psi_i$ represents a previously-measured sound source azimuth, that is, the direction of the transfer function A. In addition, i is an integer greater than or equal to 1. M represents the number of microphones. T represents a transpose matrix.

The second spatial spectrum calculation unit 109 calculates an average spatial spectrum P(ψ, f) by averaging the spatial spectrum P(ω, ψ, f) input from the first spatial spectrum calculation unit 108 in the ω direction using Expression (7). The second spatial spectrum calculation unit 109 outputs the calculated average spatial spectrum P(ψ, f) and the number of classes and the search interval input from the first spatial spectrum calculation unit 108 to the peak search unit 110.

$$\overline{P}(\psi, f) = \frac{1}{k_h - k_l + 1} \sum_{k=k_l}^{k_h} P(\omega_{[k]}, \psi, f) \quad (7)$$

In Expression (7), ω[k] represents the frequency corresponding to the k-th frequency bin. The frequency bin is discrete frequency. $k_h$ and $k_l$ represent indices of the frequency bins corresponding to the maximum frequency (upper limit frequency) and the minimum frequency (lower limit frequency) in the frequency domain. In Expression (7), $k_h-k_l+1$ is the number of spatial spectrums $P(\omega, \psi, f)$ to be subjected to summation ($\Sigma$). The reason for addition of 1 in this way is that since the frequencies $\omega$ are discrete, both the spatial spectrum $P(\omega_{[k]}, \psi, f)$ of the upper frequency and the spatial spectrum $P(\omega_{[k]}, \psi, f)$ of the lower limit frequency which are both ends of the frequency band should be added.

The average spatial spectrum $P(\psi, f)$, the number of classes, and the search interval are input to the peak search unit 110 from the second spatial spectrum calculation unit 109. The peak search unit 110 detects an azimuth $\psi^{[l]}$ (where l is a value in a range of 1 to $L_s$) which is the peak value of the input average spatial spectrum $P(\psi, f)$.

The peak search unit 110 determines whether the estimation process in the first spatial spectrum calculation unit 108 to the STF processing unit 111 ends by the number of classes input from the second spatial spectrum calculation unit 109. When it is determined that the estimation process ends by the number of classes, the peak search unit 110 outputs the detected peak value $\psi^{[l]}$ as the estimated azimuth to the output unit 113. When it is determined that the estimation process does not end by the number of classes, the peak search unit 110 outputs the detected peak value $\psi^{[l]}$, the number of classes, and the search interval to the STF processing unit 111.

The STF processing unit 111 reads a transfer function A from the transfer function storage unit 112 using the peak value $\psi^{[l]}$, the number of classes, and the search interval input from the peak search unit 110 or calculates an interpolated transfer function Â. Specifically, the STF processing unit determines whether the transfer function A corresponding to an azimuth to be searched for is stored in the transfer function storage unit 112. When it is determined that the transfer function A corresponding to an azimuth to be searched for is stored in the transfer function storage unit 112, the STF processing unit 111 reads the corresponding transfer function A from the transfer function storage unit 112. When it is determined that the transfer function A corresponding to an azimuth to be searched for is not stored in the transfer function storage unit 112, the STF processing unit 111 calculates the corresponding interpolated transfer function Â. The STF processing unit 111 outputs the read transfer function A or the calculated interpolated transfer function Â to the first spatial spectrum calculation unit 108.

When a predetermined search range (also referred to as a class) is completely searched, the STF processing unit 111 calculates a new search range and a new search interval based on the azimuth in which the peak value is detected as described later. The STF processing unit 111 outputs the calculated search range and the calculated search interval to the first spatial spectrum calculation unit 108.

The output unit 113 outputs the estimated azimuth $\psi$ input from the peak search unit 110, for example, to the sound source separation unit 13 (see FIG. 2). For example, when only the sound direction estimation unit 11 is mounted on a robot, the output unit 113 may be a display device not shown. In this case, the output unit 113 may display the estimated azimuth as character information or an image on a display unit.

As described above, the sound direction estimation device according to this embodiment includes a transfer function storage unit (112) configured to store transfer functions of sound sources in correlation with the directions of the sound sources, a calculation unit (class number calculation unit 107) configured to calculate the number of classes to be searched and a search interval for each class based on a desired search range and a desired spatial resolution for searching for the directions of the sound sources, and a sound source localization unit (peak search unit 110 and STF processing unit 111) configured to search the search range for every search interval using the transfer function, to estimate the direction of the sound source based on the search result, to update the search range and the search interval based on the estimated direction of the sound source until the number of classes calculated by the calculation unit is reached, and to estimate the direction of the sound source.

With this configuration according to this embodiment, the number of classes to be searched by the class number calculation unit 107 and the search interval are calculated. Then, the sound source localization unit 12 (FIG. 3) divides a predetermined search range into coarse search intervals and searches the search range with the coarse search intervals to estimate the sound direction. Then, the sound source localization unit 12 selects one search interval corresponding to the estimated direction and updates the search range with the selected search interval as a new search range. Then, the sound source localization unit 12 divides the new search range into finer search intervals, updates the search range, and searches the search range with the finer search intervals to estimate the sound direction. As a result, in this embodiment, it is possible to reduce the processing time to be spent in estimating a sound direction.

Figure 4:
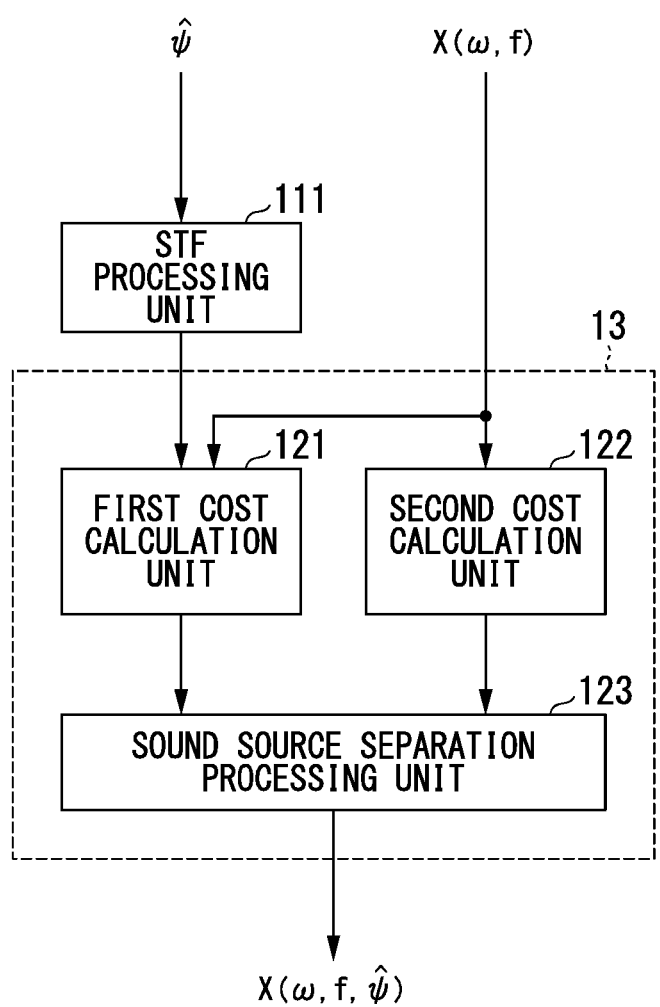
FIG. 4 is a block diagram illustrating a sound source separation unit in the first embodiment.

FIG. 4 is a block diagram illustrating the sound source separation unit 13 in this embodiment. As shown in FIG. 4, the sound source separation unit 13 includes a first cost calculation unit 121, a second cost calculation unit 122, and a sound source separation processing unit 123.

The first cost calculation unit 121 calculates a cost function $J_{GC}(W)$ using a sound source separation (GSS (Geometric Source Separation)) method based on constraint conditions and outputs the calculated cost function $J_{GC}(W)$ to the sound source separation processing unit 123.

The first cost calculation unit 121 realizes geometric constraint by designating a transfer function for D of the cost function $J_{GC}(W)$ expressed by Expression (8). The cost function $J_{GC}(W)$ is a degree of geometric constraint and is used to calculate a separation matrix W.

$$J_{GC}(W)=\|E_{GC}\|^2 \qquad (8)$$

In Expression (8), $E_{GC}$ is expressed by Expression (9).

$$E_{GC}=\text{diag}[WD-I] \qquad (9)$$

In Expression (9), W represents a separation matrix and D represents a transfer function matrix. In this embodiment, by using the interpolated transfer function Â interpolated by the STF processing unit 111 or the read transfer function A for the transfer function matrix D, it is possible to apply geometric constraint in a correct sound direction.

The second cost calculation unit 122 calculates a cost function $J_{HDSS}(W)$ using a high-order decorrelation-based sound separation (HDSS) method which is an extension of independent component analysis, and outputs the calculated cost function $J_{HDSS}(W)$ to the sound source separation processing unit 123.

The sound source separation processing unit 123 calculates a cost function $J_{GHDSS}(W)$ as expressed by Expression (10) using the cost function $J_{GC}(W)$ input from the first cost calculation unit 121 and the cost function $J_{HDSS}(W)$ input from the second cost calculation unit 122. That is, in this embodiment, a method in which the GC method and the HDSS method are combined is used. This combined method is called a GHDSS (Geometric High-order Decorrelation-based Source Separation) method in the present invention.

$$J_{GHDSS}(W)=\alpha J_{HDSS}(W)+(1-\alpha)J_{GC}(W) \quad (10)$$

In Expression (10), α is a scalar and is an integer of 0 to 1. In Expression (10), the cost function $J_{HDSS}(W)$ is expressed by Expression (11).

$$J_{HDSS}(W)=\|E[E_\phi]\|^2 \quad (11)$$

In Expression (11), E[•] represents an expected value and a bold character E represents a vector E. $E_\phi$ represents a cost function used instead of the correlation matrix E in DSS (Decorrelation-based Source Separation).

In Expression (11), $E_\phi$ is expressed by Expression (12).

$$E\phi=\phi(y)y^H-\mathrm{diag}[\phi(y)y^H] \quad (12)$$

In Expression (12), a bold character y represents a vector. A vector $E=yy^H-I$ is defined. Vector I represents a unit matrix. Reference sign H represents a complex conjugate.

$\phi(y)$ is a nonlinear function and is expressed by Expression (13).

$$\phi(y) = [\phi(y_1), \phi(y_2), \ldots, \phi(y_N)]^T \quad (13)$$

$$\phi(y_i) = -\frac{\partial}{\partial y_i}\log p(y_i)$$

In Expression (13), $p(y_i)$ represents a joint probability density function (PDF) of y.

$\phi(y_i)$ can be defined variously, and a hyperbolic-tangent-based function expressed by Expression (14) may be used as an example of $\phi(y_i)$.

$$\phi(y_i)=\tan h(\eta|y_i|)e^{j\cdot\theta(y_i)} \quad (14)$$

In Expression (14), η is a scaling parameter.

The sound source separation processing unit 123 adaptively calculates the separation matrix W using Expression (15) so as to minimize the cost functions $J_{GC}$ and $J_{HDSS}$. The sound source separation processing unit 123 separates sound components from multiple channels of sound signals input from the sound input unit 101 (see FIG. 3) based on the separation matrix W estimated in this way. The sound source separation processing unit 123 outputs the separated source components, for example, to the acoustic feature extraction unit 14.

$$W_{t+1}=W_t-\mu_{HDSS}J'_{HDSS}(W_t)-\mu_{GC}J'_{GC}(W_t) \quad (15)$$

In Expression (15), t represents time, $\mu_{HDSS}$ represents a step size used to update an error matrix, $\mu_{GC}$ represents a step size used to update a geometric error matrix. $J'_{HDSS}(W_t)$ represents an HDSS error matrix and is a numerical sequence obtained by differentiating the matrix $J_{HDSS}$ with respect to each input element. $J'_{GC}(W_t)$ represents a geometric error matrix and is a numerical sequence obtained by differentiating the matrix $J_{GC}$ with respect to each input element.

The step size $\mu_{GC}$ is expressed by Expression (16) using $E_{GC}$ and the geometric error matrix $J'_{GC}(W_t)$. The step size $\mu_{HDSS}$ is expressed by Expression (17) using $E_{HDSS}$ and the geometric error matrix $J'_{GHDSS}$.

$$\mu_{GC} = \frac{|E_{GC}|^2}{2|J'_{GC}|^2} \quad (16)$$

$$\mu_{HDSS} = \frac{|E_{HDSS}|^2}{2|J'_{HDSS}|^2} \quad (17)$$

As described above, the sound source separation unit 13 in this embodiment separates sound sources by sequentially calculating the separation matrix W using the GHDSS method.

This embodiment describes an example where the sound source separation unit 13 separates sound sources using the GDHSS method, but the sound sources may be separated using a known blind signal source separation (BSS) method or the like.

Figure 5:
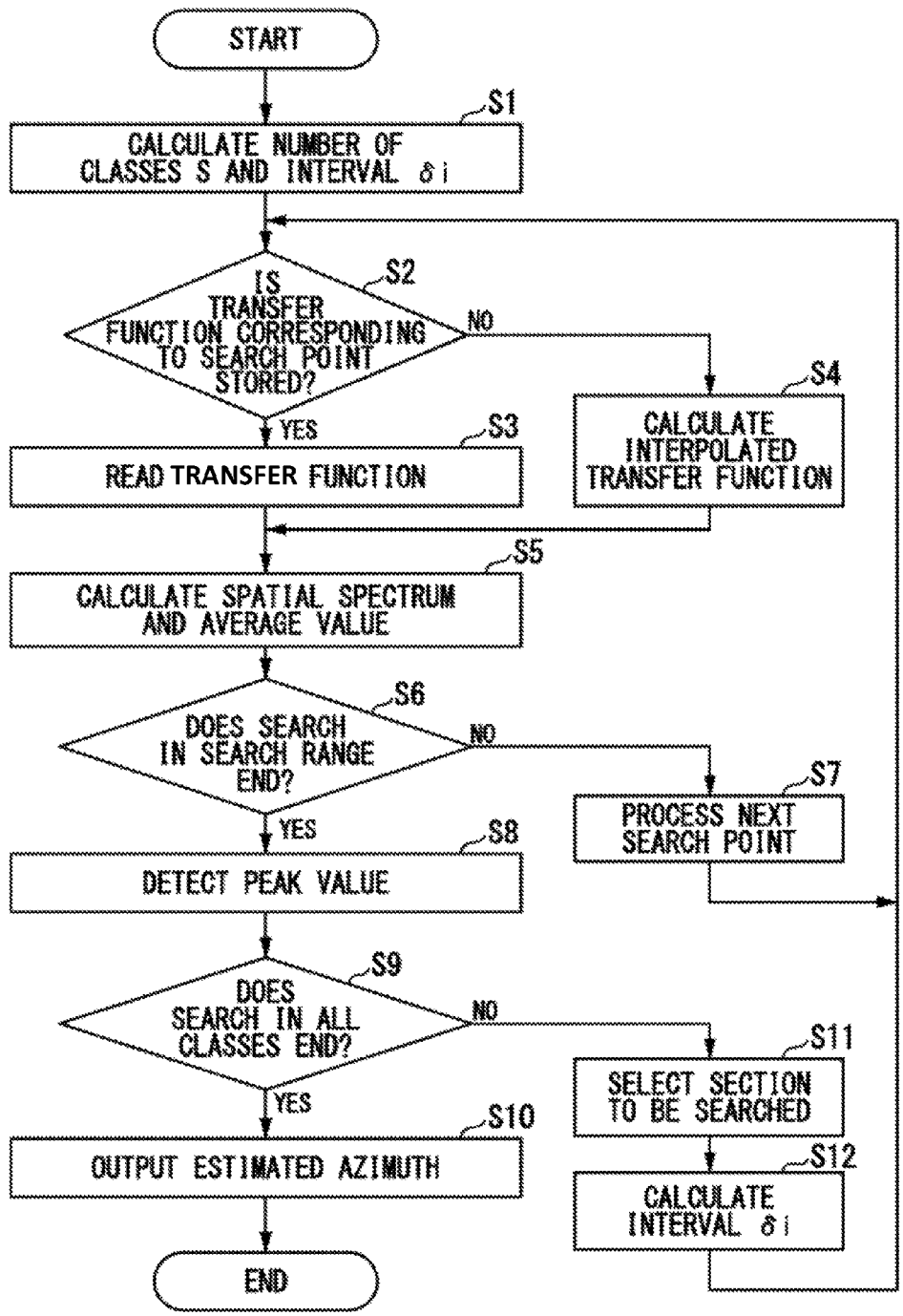
FIG. 5 is a flowchart illustrating a process flow of a classification search process in the first embodiment.
Figure 6:
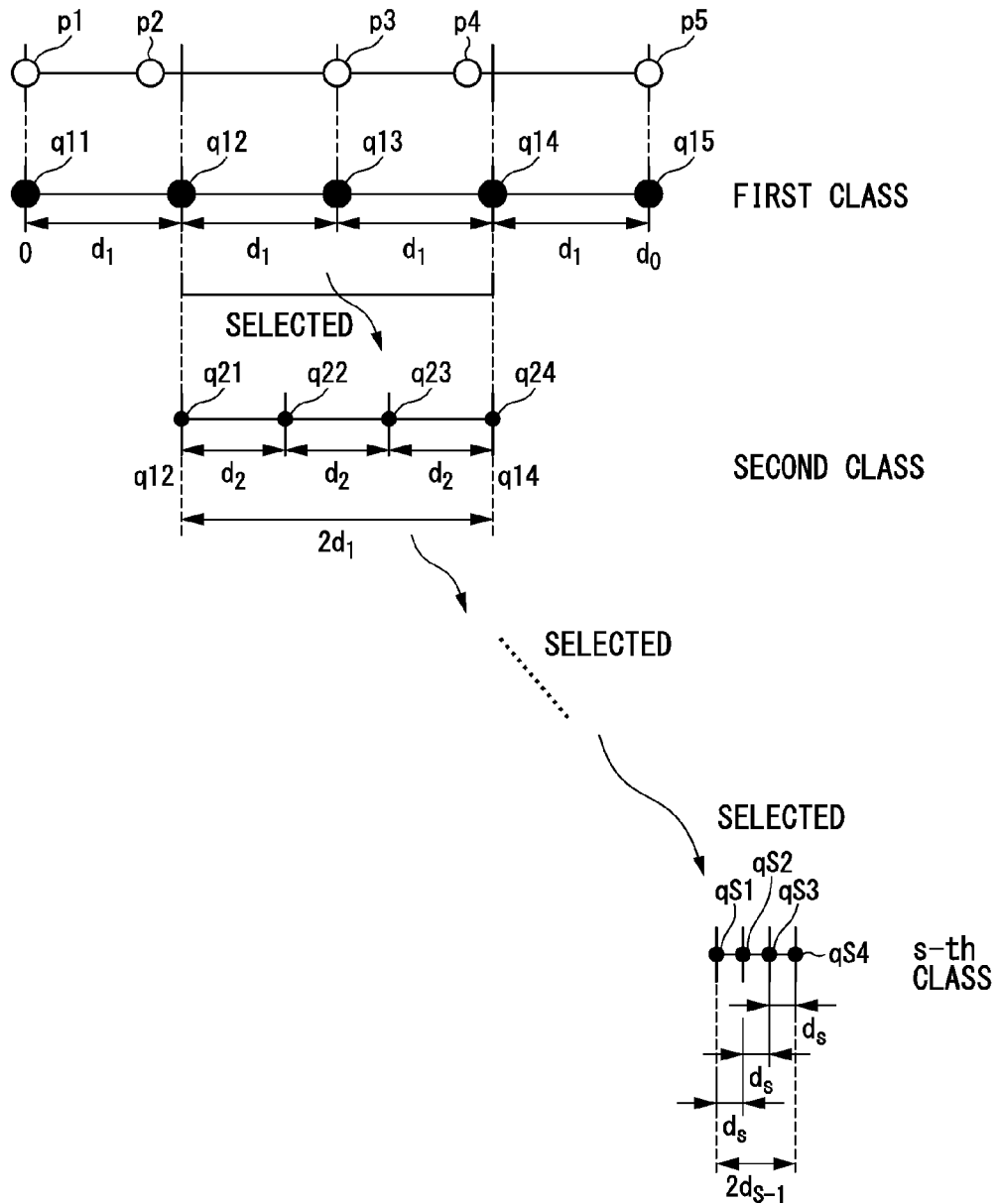
FIG. 6 is a diagram illustrating the process flow of the classification search process in the first embodiment.

The classification search process which is performed by the class number calculation unit 107 to the STF processing unit 111 will be described below. FIG. 5 is a flowchart illustrating the process flow of the classification search process according to this embodiment. FIG. 6 is a diagram illustrating the classification search process according to this embodiment.

As shown in FIG. 6, the search range ranges from 0 to $d_0$. The specific search range ranges, for example, from 0 degrees to 180 degrees. The search interval of the first class is $d_1$ and the search interval of the second class is $d_2$. A spatial resolution desired by a user of the sound direction estimation device 11 is the search interval $d_S$ of the S-th class. In FIG. 6, an example where the search interval of each class is 4 is shown for the purpose of simplification of explanation, but the number of search intervals is not limited to this. Reference signs p1 to p5 represent measurement points at which a transfer function is measured in advance. Specifically, measurement point p1 is 0 degrees, measurement point p2 is 30 degrees, measurement point p3 is 90 degrees, measurement point p4 is 130 degrees, and measurement point p5 is 180 degrees. Reference signs q11 to q15 represent search points of the first class. Specifically, search point q11 is 0 degrees, search point q12 is 45 degrees, search point q13 is 90 degrees, search point q14 is 135 degrees, and search point q15 is 180 degrees.

It is assumed that the transfer functions $A(\omega, \psi_{p1})$ to $A(\omega, \psi_{p4})$ corresponding to the azimuths p1, p2, p3, and p4 are stored in advance in the transfer function storage unit 112.

(Step S1) A use of the sound direction estimation device 11 selects a desired spatial resolution. The class number calculation unit 107 calculates the number of classes S and the search interval $\delta_i$ using Expressions (18) and (19) based on the desired spatial resolution and the search range selected by the user of the device, and outputs the calculated number of classes S, the calculated search interval $\delta_i$, and the eigenvectors input from the matrix calculation unit 106 to the first spatial spectrum calculation unit 108. The calculation of the number of classes S and the search interval $\delta_i$ will be described later. After the process of step S1 ends, the process flow goes to step S2.

$$S = \log(d_0/d_S) \quad (18)$$

$$d_s = \sqrt[S]{d_0^{S-s}d_S^s} = d_0^{\frac{S-s}{S}}d_S^{\frac{s}{S}} \quad (19)$$

In Expression (19), $d_S$ represents the search interval of the s-th class. Here, s is an integer of 1 to S.

(Step S2) The STF processing unit 111 determines whether the transfer function $A(\omega, \psi)$ corresponding to the first search point (q11 in FIG. 6) is stored in the transfer function storage unit 112. The STF processing unit 111 performs the process of step S3 When it is determined that the transfer function A(ω, ψ) corresponding to the first search point is stored in the transfer function storage unit 112 (YES in step S2), and performs the process of step S4 when it is determined that the transfer function A(ω, ψ) corresponding to the first search point is not stored in the transfer function storage unit 112 (NO in step S2).

(Step S3) When it is determined that the transfer function A(ω, ψ) corresponding to the first search point is stored in the transfer function storage unit 112, the STF processing unit 111 reads the transfer function A(ω, ψ) corresponding to the first search point (q11 in FIG. 6) stored in the transfer function storage unit 112 and outputs the read transfer function A(ω, ψ) to the first spatial spectrum calculation unit 108. After the process of step S3 ends, the process flow goes to step S5.

(Step S4) When it is determined that the transfer function A(ω, ψ) corresponding to the first search point is not stored in the transfer function storage unit 112, the STF processing unit 111 an interpolated transfer function A^ of the first search point through interpolation using the transfer functions corresponding to two measurement points adjacent to the first search point. For example, in case of the search point q12, the interpolated transfer function A^ of the search point q12 is calculated using the transfer functions A of two measurement points p2 and p3 adjacent thereto. The STF processing unit 111 may use, for example, an FDLI method, a TDLI method, and an FTDLI method for the interpolation. These interpolation methods will be described later.

(Step S5) The first spatial spectrum calculation unit 108 calculates a spatial spectrum P(ω, ψ, f) using the transfer function A or the interpolated transfer function A^ input from the STF processing unit 111 and using Expression (5). Then, the second spatial spectrum calculation unit 109 calculates an average spatial spectrum P(ψ, f) using the spatial spectrum P(ω, ψ, f) calculated by the first spatial spectrum calculation unit 108 and using Expression (7) and outputs the calculated average spatial spectrum P(ψ, f) and information indicating the number of the search point to the peak search unit 110. The numbers of the search points are numbers assigned to correspond to the search points q11 to q15. After the process of step S5 ends, the process flow goes to step S6.

(Step S6) The peak search unit 110 determines whether all the search points in the search range are searched. The peak search unit 110 performs the process of step S8 when it is determined that all the search points in the search range are searched (YES in step S6), and performs the process of step S7 when it is determined that all the search points in the search range are not searched (NO in step S6).

(Step S7) When it is determined that all the search points in the search range are not searched, the peak search unit 110 outputs information indicating an instruction to search the next search point to the STF processing unit 111. Regarding the next search point, for example, the search point q12 is the next search point when the process of searching the search point q11 ends in step S5. The search may be performed from 0 to $d_0$ or may be performed from $d_0$ to 0.

(Step S8) When it is determined that all the search points in the search range are searched, the peak search unit 110 extracts an azimuth $\psi^{[i]}$ having the maximum value out of all the average spatial spectrum P(ψ, f) calculated in the search range. After the process of step S8 ends, the process flow goes to step S9.

(Step S9) The peak search unit 110 determines whether all the classes calculated in step S1 are searched. The peak search unit 110 performs the process of step S10 when it is determined that all the classes calculated in step S1 are searched (YES in step S9), and performs the process of step S11 when it is determined that all the classes calculated in step S1 are not searched (NO in step S9).

(Step S10) The peak search unit 110 outputs the extracted azimuth $\psi^{[i]}$ as the estimated azimuth $\hat{\psi}$ to the output unit 113. Then, the output unit 113 outputs the estimated azimuth $\hat{\psi}$ input from the peak search unit 110, for example, to the acoustic feature extraction unit 14 (see FIG. 2) and ends the sound direction estimation process.

(Step S11) When it is determined that all the classes calculated in step S1 are searched, the STF processing unit 111 selects two search points $(\psi^{[i]}-\delta_i)$ and $(\psi^{[i]}+\delta_i)$ adjacent to the azimuth $\psi^{[i]}$ having the peak value as a section to be searched next. Hereinafter, $\psi^{[i]}-\delta_i$ is written as $\psi^{[i-]}$ and $\psi^{[i]}+\delta_i$ is written as $\psi^{[i+]}$.

For example, when the search point at which the peak value is detected is q13 in FIG. 6, the STF processing unit 111 selects the search points q12 and q14 as the two adjacent search points. In this case, the search range of the second class ranges from the search point q12 to q14 and the width of the search range is $2d_1$. After the process of step S10 ends, the process flow goes to step S11.

(Step S12) The STF processing unit 111 calculates the search interval d used to search the second class. The calculation of the search interval d in each class will be described later. After the process of step S12 ends, the process flow returns to step S2.

The first spatial spectrum calculation unit 108 to the STF processing unit 111 repeatedly perform the processes of steps S2 to S9 in the second class, calculates the average spatial spectrum P(ψ, f) using the transfer function (or interpolated transfer function) of each interval, and estimates the azimuth ψ having the peak value. After the search of the second class ends, the STF processing unit 111 selects two search points adjacent to the search point having the peak value and calculates the search interval d used for the next class. Thereafter, the first spatial spectrum calculation unit 108 to the STF processing unit 111 repeatedly perform the processes of steps S2 to S12 on all the classes calculated in step S1 to estimate a sound direction.

The interpolation performed by the STF processing unit 111 will be described below. The STF processing unit 111 interpolates the transfer function A to generate an interpolated transfer function A^, for example, using any one of (1) an FDLI method, (2) a TDLI method, and (3) an FTDLI method to be described below.

The transfer functions A at the two measurement points are expressed by Expressions (20) and (21). Such transfer functions A are stored in advance in the transfer function storage unit 112. A transfer function $A(\omega, \psi_1)$ is a transfer function in the direction $\psi_1$ and a transfer function $A(\omega, \psi_2)$ is a transfer function in the direction $\psi_2$.

$$A(\omega,\psi_1)=[(A_1(\omega,\psi_1), \ldots, A_M(\omega,\psi_1))]^T \qquad (20)$$

$$A(\omega,\psi_2)=[(A_2(\omega,\psi_2), \ldots, A_M(\omega,\psi_2))]^T \qquad (21)$$

(1) Frequency Domain Linear or Bi-Linear Interpolation (FDLI) Method

In the FDLI method, the STF processing unit 111 performs linear interpolation at two measurement points using Expression (22) to calculate the interpolated transfer function A^.

$$\hat{A}_{m[\psi_1,\psi_2]}(\omega,\hat{\psi})+D_A A_m(\omega,\psi_1)+(1-D_A)A_m(\omega,\psi_2) \qquad (22)$$

In Expression (22), $D_A$ represents an interpolation coefficient and has a value in a range of 0 to 1. The FDLI method is characterized in that a phase can be linearly interpolated.
(2) Time Domain Linear Interpolation (TDLI) Method In the TDLI method, Expression (23) is used.

$$\hat{a}_{m[\psi_1,\psi_2]}(t+d_{\hat{\psi}},\hat{\psi}) = \frac{k_{\psi_2} a_m(t+d_{\psi_2},\psi_2) + k_{\psi_1} a_m(t+d_{\psi_1},\psi_1)}{k_{\psi_2}+k_{\psi_1}} \quad (23)$$

In Expression (23), $d_{\hat{\psi}}$ is expressed by Expression (24).

$$d_{\hat{\psi}} = \frac{k_{\psi_2} d_{\psi_2} + k_{\psi_1} d_{\psi_1}}{k_{\psi_2}+k_{\psi_1}} \quad (24)$$

In Expressions (23) and (24), $k_{\psi1}$ and $k_{\psi2}$ are coefficients which are geometrically calculated, $d_{\psi1}$ and $d_{\psi2}$ are time delays which are geometrically calculated, and $a_m(t, \psi)$ is an expression of $A_m(\omega, \psi)$ in the time domain.

Expression (23) is considered as amplitude interpolation, Expression (24) is considered as phase interpolation, and the TDLI method in the frequency domain is expressed by Expression (25).

$$\hat{A}_{m[\psi_1,\psi_2]}(\omega,\hat{\psi}) = A_m(\omega,\psi_2)\left(\frac{A_m(\omega,\psi_1)}{A_m(\omega,\psi_2)}\right)^{D_A} \quad (25)$$

As described above, in the TDLI method, the STF processing unit 111 calculates the interpolated transfer function A^ by performing linear interpolation on two measurement points using Expression (25). The TDLI method is characterized in that amplitude can be interpolated.
(3) Frequency Time Domain Linear or Bi-Linear Interpolation (FTDLI) Method The FTDLI method is a linear interpolation method in which the FDLI method and the TDLI method are combined. In the FTDLI method, a phase is calculated through the linear interpolation in the frequency domain and an amplitude is calculated through the linear interpolation in the time domain. In the FTDLI method, the STF processing unit 111 calculates the interpolated transfer function A^ by performing linear interpolation on two measurement points using Expression (26).

$$\hat{A}_{m[\psi_1,\psi_2]}(\omega,\hat{\psi}) + \lambda_{m[T]}\exp(-j\omega t_{m[F]}) \quad (26)$$

The process of calculating the interpolated transfer function A^ in the FTDLI method will be described below.

(I) First, an interpolated transfer function is calculated using Expressions (22) and (25). In the following description, the calculated interpolated transfer functions are expressed by Expressions (27) and (28).

$$\hat{A}_{m[F|\psi_1,\psi_2]}(\omega,\hat{\psi}) \quad (27)$$

$$\hat{A}_{m[T|\psi_1,\psi_2]}(\omega,\hat{\psi}) \quad (28)$$

(II) Then, Expressions (27) and (28) are decomposed into the phase and the amplitude as expressed by Expressions (29) and (30).

$$\hat{A}_{m[F|\psi_1,\psi_2]}(\omega,\hat{\psi}) = \lambda_{m[F]}\exp(-j\omega t_{m[F]}) \quad (29)$$

$$\hat{A}_{m[T|\psi_1,\psi_2]}(\omega,\hat{\psi}) = \lambda_{m[T]}\exp(-j\omega t_{m[T]}) \quad (30)$$

By using Expressions (29) and (30), the interpolated transfer function A^($\omega$, $\psi$^) is expressed by Expression (26). The FTDLI method is characterized in that a phase and an amplitude can be linearly interpolated.

The process of calculating the optimal number of classes and the search interval which is performed by the class number calculation unit 107 in step S1 will be described below.

Figure 7:
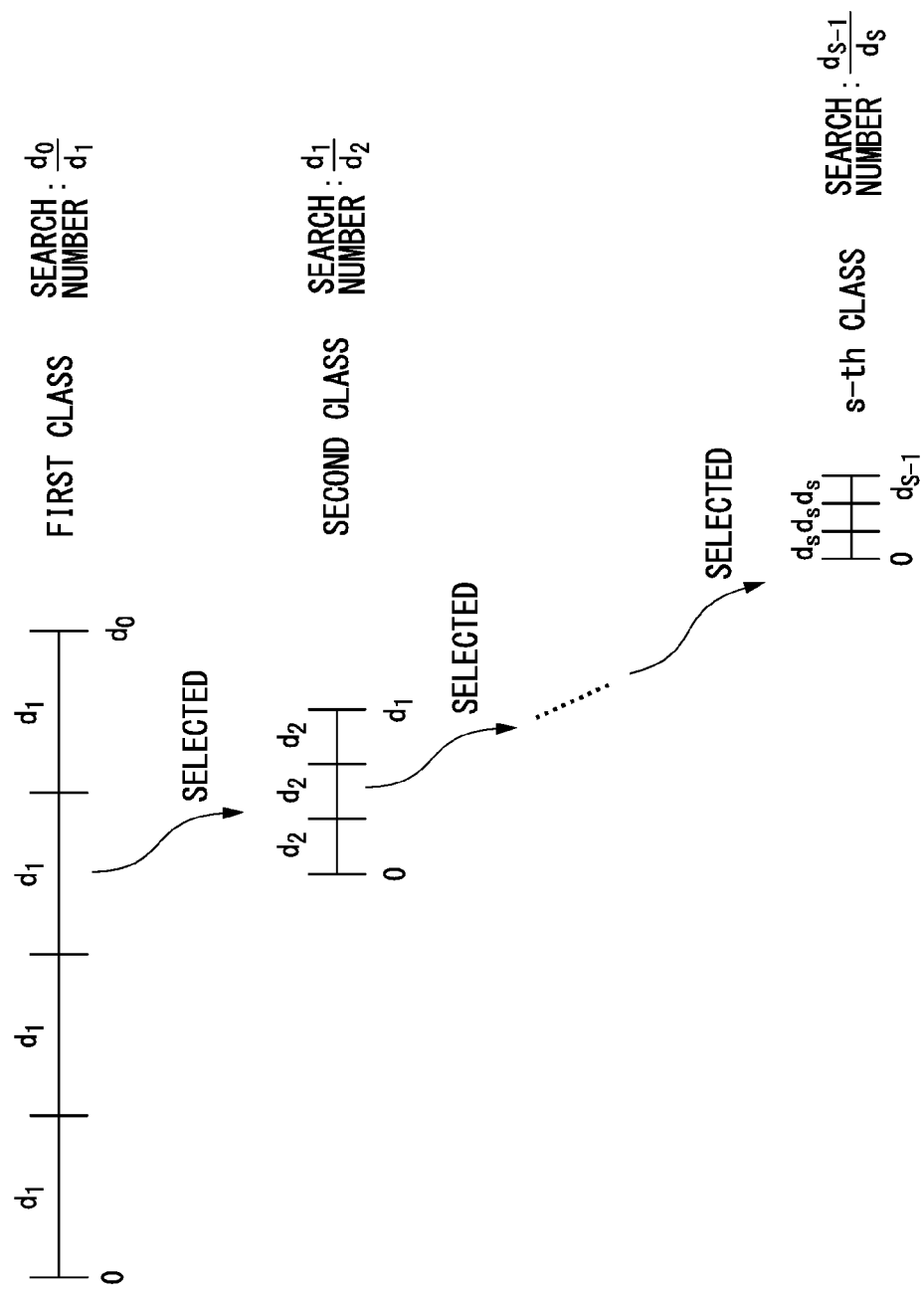
FIG. 7 is a diagram illustrating a process flow of a process of calculating the number of classes in the first embodiment.

FIG. 7 is a diagram illustrating the process of calculating the number of classes and the search interval in this embodiment. In the following description, the left end of the search range for each class is set to 0 for the purpose of convenience. For the purpose of convenience, it is assumed that a peak value is located between a search point and a search point in each class, for example, in a search interval $d_1$ of the first class.

In the following description, known values are the search range $d_0$ of the first class and the search interval of the S-th class $d_S$. Values to be calculated are the number of classes S in which the search number is minimized and the search interval $d_s$ in each class.

First, the interval between the direction $\psi_1$ and the direction $\psi_2$ of two transfer functions is defined as d0. That is, the range from the interval 0 between the direction $\psi_1$ and the direction $\psi_2$ of two transfer functions to the interval $d_0$ is searched with an interval $d_s$, the search number is $d_0/d_s$. In order to minimize the search number to reduce calculation costs, the search is hierarchically performed as follows in this embodiment.

As shown in FIG. 7, it is assumed that the number of classes is S and the interval of the s-th class is $d_s$. Here, s ranges from 1 to S. That is, the interval of the first class is $d_1$ and the interval of the second class is $d_2$ (where $d_2$ is smaller than $d_1$). In classification, first, the s-th class is searched and one interval $d_s$ including a peak value is selected by search. Then, the selected interval $d_s$ is set as the (s+1)-th class. The (s+1)-th class is searched with $d_{s+1}$ as the interval. One interval $d_{s+1}$ having a peak value is selected by the search of the (s+1)-th class and the selected interval $d_{s+1}$ is considered as the (s+2)-th class. This process is called classification. In the classification, the interval of an upper class is coarse and the interval of a lower class is fine. In the S-th class, since the interval is $d_S$ and the number of intervals is $d_{S-1}$, the search number is $(d_{S-1})/d_S$. Hereinafter, the interval $d_s$ is also referred to as granularity.
Number of Classes of 2

As shown in FIG. 7, the total search number $F(d_1)$ is expressed by Expression (31) when the second class (S=2) is searched.

$$F(d_1) = \frac{d_0}{d_1} + \frac{d_1}{d_S} \quad (31)$$

In Expression (31), only $d_1$ is a variable. Accordingly, when Expression (31) is partially differentiated with the variable $d_1$ to calculate the minimum value of Expression (31), Expression (32) is obtained.

$$\frac{\partial F(d_1)}{\partial d_1} = -\frac{d_0}{d_1^2} + \frac{1}{d_S} \quad (32)$$

Therefore, the interval $d_1$ in which Expression (32) is 0 is $\sqrt{(d_0 d_S)}$.

With this value of the interval $d_1$, the search number of the first class is expressed by Expression (33) and the search number of the second class is expressed by Expression (34).

$$\frac{d_0}{d_1} = \frac{d_0}{\sqrt{d_0 d_S}} = \sqrt{\frac{d_0}{d_S}} \qquad (33)$$

$$\frac{d_1}{d_S} = \frac{\sqrt{d_0 d_S}}{d_S} = \sqrt{\frac{d_0}{d_S}} \qquad (34)$$

By setting the search numbers of the classes to be equal to each other using Expressions (33) and (34), it is possible to minimize the total search number.

Number of Classes of s

Conditions for minimizing the total search number when the number of classes is s will be described below. Even when the number of classes is s, it is possible to minimize the total search number by setting the search numbers of the classes to be equal to each other.

The reason thereof will be described below using a proof-by-contradiction method.

When the number of classes is s, the total search number is $d_0/d_1 + d_1/d_2 + \ldots + d_{(s-1)}/d_s$. It is assumed that the total search number is the minimum and there is a class of $d_{(i-1)}/d_i \neq d_i/d_{(i+1)}$. Here, i is an integer of 1 to S. In two classes of i−1 to i+1, when the search numbers of the classes are $d_{(i-1)}/d_i = d_i/d_{(i+1)}$, $(d_{(i-1)}/d_i) + (d_i/d_{(i+1)})$ is minimized as described in the example of two classes and thus this assumption is contradictory. That is, classes of $d_{(i-1)}/d_i \neq d_i/d_{(i+1)}$ do not exist.

As a result, when the search numbers of the classes are set to be equal to each other regardless of the number of classes, it is possible to minimize the total search number. Therefore, when the number of classes is s, the condition for minimizing the total search number is $d_0/d_1 = d_1/d_2 = \ldots = d_{(s-1)}/d_s$.

This conditional expression can be modified to Expression (35).

$$d_0 = \frac{1}{d_2}d_1^2 = \frac{1}{d_2}\left(\frac{d_2^2}{d_3}\right)^2 = \frac{1}{d_3^2}d_2^3 = \frac{1}{d_3^2}\left(\frac{d_3^2}{d_4}\right)^3 = \ldots = \frac{1}{d_S^{S-1}}d_{S-1}^S \qquad (35)$$

From Expression (35), the granularity $d_{S-1}$ in which the total search number is minimized is expressed by Expression (36).

$$d_{S-1} = \sqrt[S]{d_0 d_S^{S-1}} \qquad (36)$$

Number of Classes of S

When the number of classes is S, the total search number G(S) is expressed by Expression (37) from $d_0/d_1 = d_1/d_2 = \ldots = d_{(S-1)}/d_S$.

$$G(S) = \frac{d_0}{d_1} + \frac{d_1}{d_2} + \ldots + \frac{d_{S-1}}{d_S} \qquad (37)$$
$$= S \frac{d_{S-1}}{d_S}$$
$$= S \frac{\sqrt[S]{d_0 d_S^{S-1}}}{d_S}$$
$$= S\left(\frac{d_0}{d_S}\right)^{\frac{1}{S}}$$

When Expression (37) is partially differentiated with S to calculate S of minimizing Expression (37), Expression (38) is obtained.

$$\frac{\partial G(S)}{\partial S} = \left(\frac{d_0}{d_S}\right)^{\frac{1}{S}} - S\frac{1}{S^2}\log\left(\frac{d_0}{d_S}\right)\left(\frac{d_0}{d_S}\right)^{\frac{1}{S}} = \left(\frac{d_0}{d_S}\right)^{\frac{1}{S}}\left(1 - \frac{1}{S}\log\left(\frac{d_0}{d_S}\right)\right) \qquad (38)$$

When Expression (38) is 0, the total search number is minimized. Accordingly, the minimum total search number is $S=\log(d_0/d_S)$. Similarly to Expressions (35) and (36), when the conditional expression is modified and the modified conditional expression is substituted for $S=\log(d_0/d_S)$, the granularity $d_s$ of each class can be calculated using Expression (39).

$$d_s = \sqrt[S]{d_0^{S-s} d_S^s} = d_0^{\frac{S-s}{S}} d_S^{\frac{s}{S}} \qquad (39)$$

As described above, the class number calculation unit 107 (see FIG. 3) calculates the number of classes S with which the total search number is minimized using $S=\log(d_0/d_S)$ and calculates the interval (granularity) $d_S$ with which the total search number is minimized using Expression (39).

As described above, in searching for a sound source in this embodiment, a wide range is searched with a coarse resolution and a narrow range is searched with a finer interval based on the search result. According to this embodiment, it is possible to reduce the number of times of search by hierarchically performing such a search. Accordingly, it is possible to reduce calculation costs while maintaining the estimation performance of sound source localization.

Second Embodiment

The first embodiment has described the example where the class number calculation unit 107 calculates the number of classes S and the granularity $d_S$ with which the total search number is minimized.

This embodiment describes an example where interpolation is performed between the direction $\psi_1$ and the direction $\psi_2$ of the transfer functions and a search is performed in consideration of the interpolated direction.

Figure 8:
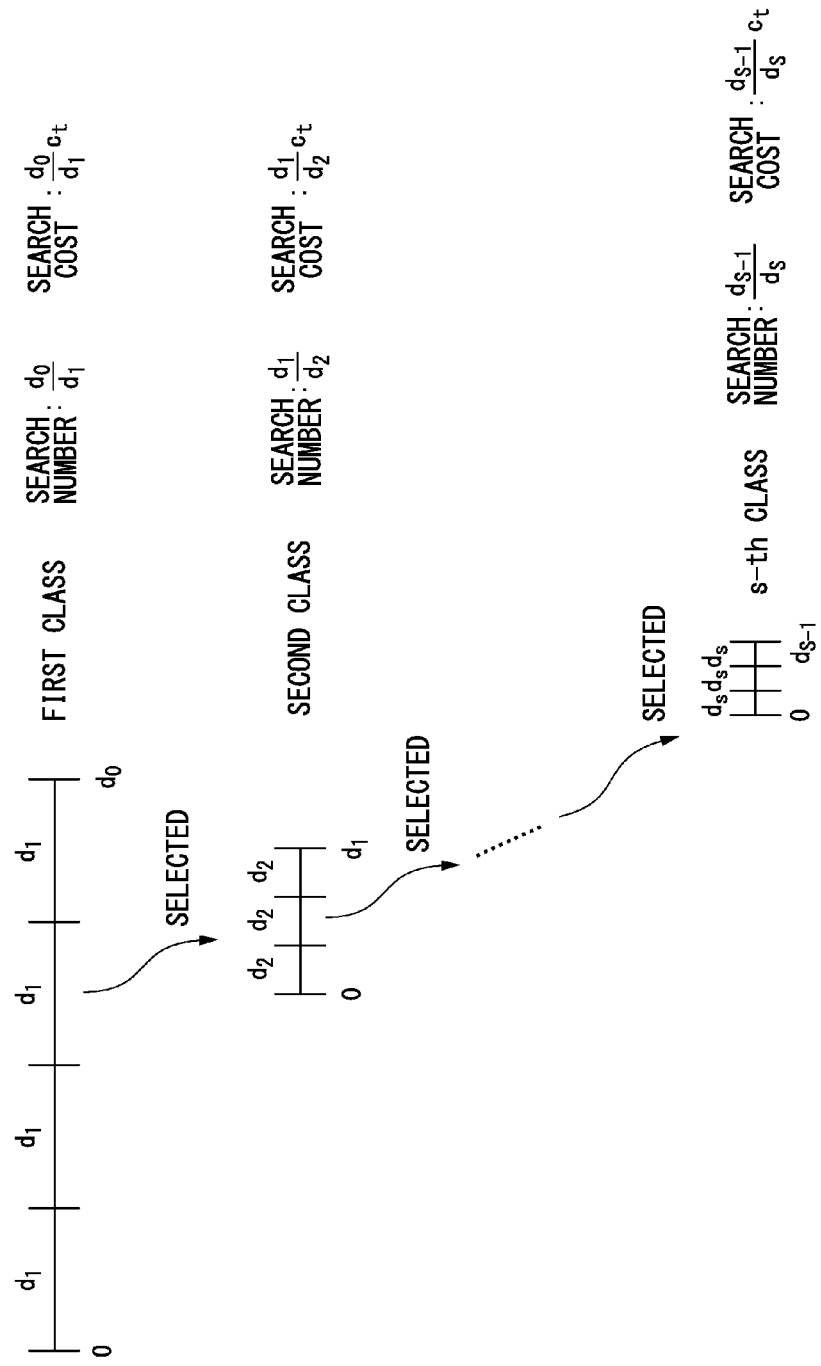
FIG. 8 is a diagram illustrating a process flow of a process of calculating the number of classes and an interval in a second embodiment of the present invention.

FIG. 8 is a diagram illustrating a process of calculating the number of classes and the interval in this embodiment. FIG. 8 is different from FIG. 7, in that a search cost is used. The search cost is a cost spent in the search. A calculation cost spent in searching one search point is defined as $c_t$. When a search point requiring interpolation exists in the search points, the calculation cost spent in interpolation of the search point is defined as $C_t$. A search point is a point in each interval $d_1$ in the first class in FIG. 8. The calculation cost due to the classification is the sum of the search cost and the cost for interpolation (hereinafter, referred to as interpolation cost). The search cost is set to a value obtained by multiplying the calculation cost $c_t$ spent in searching one search point by the search number.

In the following description, known values are the search range $d_0$ of the first class and the search interval $d_S$ of the S-th class. Values to be calculated are the number of classes S in which the calculation cost is minimized and the search interval $d_s$ in each class.

As shown in FIG. 8, the search cost of the first class is $(d_0/d_1)c_t$, the search cost of the second class is $(d_1/d_2)c_t$, and the search cost of the S-th class is $(d_{S-1}/d_S)c_t$.

In this embodiment, the class number calculation unit 107 calculates the number of classes S with which the calculation cost due to classification is minimized and the granularity $d_s$.

Figure 9:
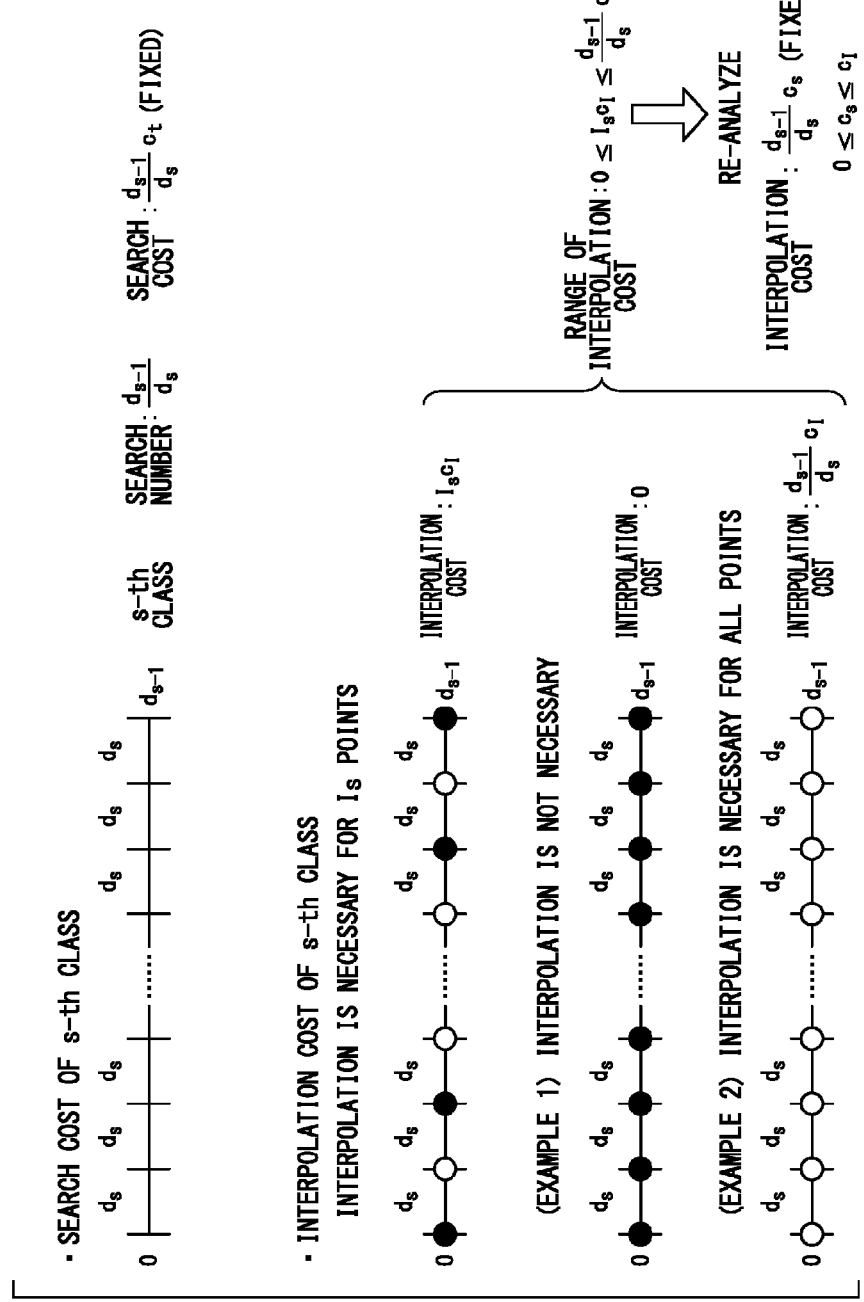
FIG. 9 is a diagram illustrating a search cost and an interpolation cost of the s-th class in the second embodiment.

FIG. 9 is a diagram illustrating the search cost and the interpolation cost of the s-th class according to this embodiment.

First, the search number of s-th class is $d_{s-1}/d_s$ and the search cost is $(d_{s-1}/d_s)c_t$. The search cost $(d_{s-1}/d_s)c_t$ has a fixed value.

The interpolation cost of the s-th class will be described below. In the s-th class, the interval (granularity) is $d_s$ and the number of search points is $d_s-1$. It is assumed that $I_s$ points out of the search points require interpolation. In FIG. 9, black circles represent search points not requiring interpolation and white circles represent search points requiring interpolation. In this case, the interpolation cost is $I_s c_I$.

When all the search points do not require any more interpolation, the interpolation cost is 0.

When all the search points require interpolation, the interpolation cost is $(d_{s-1}/d_s)c_I$.

Therefore, the range of the interpolation cost $I_s c_I$ of the s-th class ranges from 0 to $(d_{s-1}/d_s)c_I$. here, $c_s$ is set to a range of 0 to $C_I$ and the interpolation cost is set to a fixed value $(d_{s-1}/d_s)c_s$.

Therefore, the calculation cost of the s-th class is the sum of the search cost and the interpolation cost and is thus expressed by Expression (40).

$$\frac{d_{s-1}}{d_s}c_t + \frac{d_{s-1}}{d_s}c_s = \frac{d_{s-1}}{d_s}(c_t + c_s) \tag{40}$$

Accordingly, the calculation cost $\tilde{G}(S)$ in all the classes is expressed by Expression (41).

$$\tilde{G}(S) = \sum_{i=1}^{S}\left(\frac{d_{i-1}}{d_i}(c_t + c_i)\right) \tag{41}$$

In Expression (41), i ranges from 1 to S. In Expression (41), when there is only the search cost, this case corresponds to $c_i=0$.

The cost is normalized by setting $c_t$ to 1 so that the total search number G(S) of Expression (37) described in the first embodiment is equal to $\tilde{G}(S)$ in case of $c_i=0$. By the normalization with $c_t$, $c_t+c_i$ in the right side of Expression (41) is modified to $1+c_i$. $(1+c_i)$ is defined as a new variable $C_i$. Here, the variable $C_i$ is greater than or equal to 1. By replacing $c_t+c_i$ with $C_i$, Expression (41) is modified to Expression (42).

$$\tilde{G}(S) = \sum_{i=1}^{S}\left(\frac{d_{i-1}}{d_i}C_i\right) \tag{42}$$

Number of Classes of 2

A case where the number of classes is 2 will be described below.

The total search number $F(d_1)$ in this case is $(d_0/d_1)C_1 + (d_1/d_S)C_S$.

In the total search number $F(d_1)$, only $d_1$ is a variable. When the total search number $F(d_1)$ is partially differentiated to calculate the minimum value of the total search number $F(d_1)$ with $d_1$, Expression (43) is obtained.

$$\frac{\partial F(d_1)}{\partial d_1} = -\frac{d_0 C_1}{d_1^2} + \frac{C_S}{d_S} \tag{43}$$

Here, $d_1$ with which Expression (43) is 0 is $\sqrt{(C_1 d_0 d_S/C_S)}$.

At this time, the search number of the first class is expressed by Expression (44) and the search number of the second class is expressed by Expression (45).

$$\frac{d_0}{d_1}C_1 = \frac{d_0}{\sqrt{\frac{C_1 d_0 d_S}{C_S}}}C_1 = \sqrt{\frac{C_1 C_S d_0}{d_S}} \tag{44}$$

$$\frac{d_1}{d_S}C_S = \frac{\sqrt{\frac{C_1 d_0 d_S}{C_S}}}{d_S}C_S = \sqrt{\frac{C_1 C_S d_0}{d_S}} \tag{45}$$

From Expressions (44) and (45), when the intervals (granularity) weighted with $C_1$ and $C_S$ are equal to each other, it is possible to minimize the calculation cost from $d_0$ to $d_s$.

Similarly, when the number of classes is s, the condition for minimizing the calculation cost is that the calculation costs $(d_{i-1}/d_i)C_i$ of the classes weighted by $C_i$ are equal to each other. Here, i ranges from 1 to s.

Number of Classes of S

When the number of classes is S, the calculation cost $\tilde{G}(S)$ of Expression (42) is calculated using the condition of $(d_0/d_1)C_1=(d_1/d_2)C_2= \ldots =(d_{(S-1)}/d_S)C_S$. This conditional expression can be modified to Expression (46).

$$d_0 = \frac{1}{d_2}\frac{C_2}{C_1}d_1^2 \tag{46}$$

$$= \frac{1}{d_2}\frac{C_2}{C_1}\left(\frac{C_3}{C_2}\frac{d_2^2}{d_3}\right)^2$$

$$= \frac{C_2}{C_1}\left(\frac{C_3}{C_2}\right)^2 \frac{1}{d_3^2}d_2^3$$

$$= \frac{C_2}{C_1}\left(\frac{C_3}{C_2}\right)^2 \frac{1}{d_3^2}\left(\frac{C_4}{C_3}\frac{d_3^2}{d_4}\right)^3$$

$$= \frac{C_2}{C_1}\left(\frac{C_3}{C_2}\right)^2\left(\frac{C_4}{C_3}\right)^3 \frac{1}{d_4^3}d_4^4$$

$$= \ldots$$

$$= \prod_{i=2}^{S}\left(\frac{C_i}{C_{i-1}}\right)^{i-1}\frac{1}{d_S^{S-1}}d_S^S$$

$$= \prod_{i=1}^{S} \frac{1}{C_i} \frac{C_S^S}{d_S^{S-1}} d_{S-1}^S$$

From Expression (46), the granularity $d_{S-1}$ with which the calculation cost is minimized is expressed by Expression (47).

$$d_{S-1} = \sqrt[S]{\frac{d_0 d_S^{S-1}}{C_S^S} \prod_{i=1}^{S}(C_i)} \qquad (47)$$

$$= \frac{1}{C_S} \sqrt[S]{d_0 d_S^{S-1} \prod_{i=1}^{S}(C_i)}$$

From Expression (47), the calculation cost $\tilde{G}(S)$ is expressed by Expression (48).

$$\tilde{G}(K) = \sum_{i=1}^{K}\left(\frac{d_{i-1}}{d_i}C_i\right) \qquad (48)$$

$$= S\frac{d_{S-1}}{d_S}C_S$$

$$= \frac{SC_S}{d_S}\frac{1}{C_S}\sqrt[S]{d_0 d_S^{S-1} \prod_{i=1}^{S}(C_i)}$$

$$= S\left(\frac{d_0}{d_S}\prod_{i=1}^{S}(C_i)\right)^{\frac{1}{S}}$$

When Expression (48) is partially differentiated with S to calculate S for minimizing Expression (48), Expression (49) is obtained.

$$\frac{\partial \tilde{G}(S)}{\partial S} = \left(\frac{d_0}{d_S}\prod_{i=1}^{S}(C_i)\right)^{\frac{1}{S}} - S\frac{1}{S^2}\log\left(\frac{d_0}{d_S}\prod_{i=1}^{S}(C_i)\right)\left(\frac{d_0}{d_S}\prod_{i=1}^{S}(C_i)\right)^{\frac{1}{S}} \qquad (49)$$

$$\left(\frac{d_0}{d_S}\prod_{i=1}^{S}(C_i)\right)^{\frac{1}{S}}\left(1 - \frac{1}{S}\log\left(\frac{d_0}{d_S}\prod_{i=1}^{S}(C_i)\right)\right)$$

S causing Expression (49) to be 0 is expressed by Expression (50).

$$S = \log\left(\frac{d_0}{d_S}\prod_{i=1}^{S}(C_i)\right) \qquad (50)$$

Therefore, when the number of classes is S, the interval (granularity) $d_s$ with which the calculation cost is minimized is expressed by Expression (51).

$$d_S = d_0^{\frac{S-s}{S}} d_S^{\frac{s}{S}} \prod_{i=1}^{S}(C_i^{\frac{S-s}{S}}) \prod_{i=S}^{s+1}\left(\frac{1}{C_i}\right) \qquad (51)$$

The class number calculation unit 107 (see FIG. 3) calculates the number of classes S with which the calculation cost is minimized using Expression (50) as described above and calculates the interval (granularity) $d_s$ with which the calculation cost is minimized using Expression (51).

Test Result

A result of a test in which the sound direction estimation device 11 according to the first embodiment or the second embodiment is mounted on a robot auditory software HARK (HRI-JP Audition for Robots with Kyoto University) which is an open source will be described below. In the following test, the sound direction estimation device 11 according to the first embodiment is mounted on a humanoid robot.

Figures 10, 11:
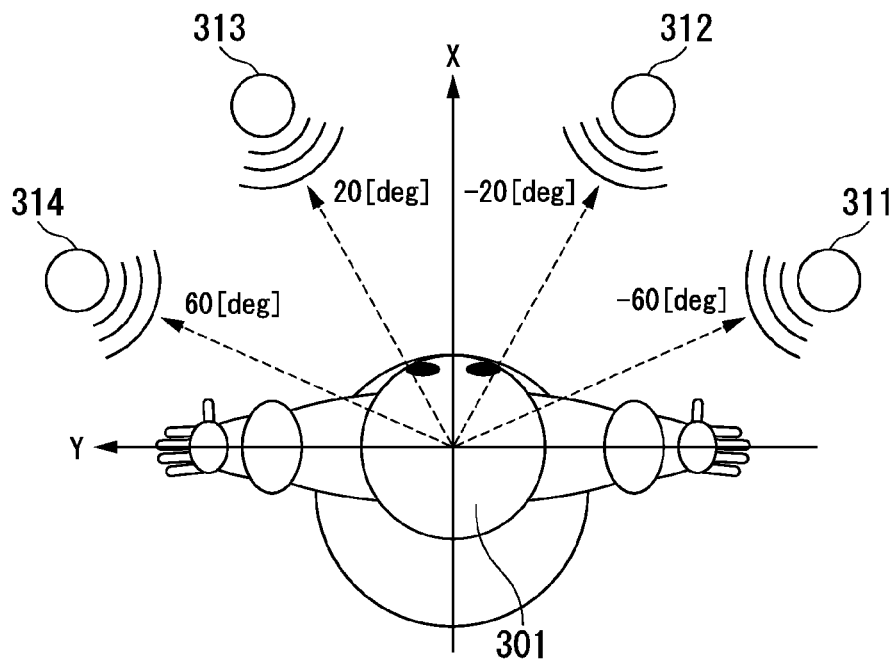
FIG. 10 is a diagram illustrating test conditions.
FIG. 11 is a diagram illustrating search points in a test.

FIG. 10 is a diagram illustrating test conditions. As shown in FIG. 10, the test conditions are that the sampling frequency 16 [kHz], the FFT score is 512 points, the shift length is 160, the number of microphones is 8, and the microphones are arranged in a circular array. In addition, the test conditions are that the number of speakers is 4, the distances to the speakers are 1.5 [m], the size of the room in which the test is carried out is 7×4 [m], and the reverberation time of the room in which the test is carried out is 0.2 [sec].

FIG. 11 is a diagram illustrating search points in the test. In FIG. 11, the left-right direction of the drawing page is a Y direction and a direction perpendicular to the Y direction is an X direction. Reference numeral 301 represents the robot on which the sound direction estimation device 11 is mounted and reference numerals 311 to 314 represent the speakers, that is, the sound sources. The sound source 311 is located at −60 [deg] in the clockwise direction about the X axis, the sound source 312 is located at −20 [deg] in the clockwise direction about the X axis, the sound source 313 is located at 30 [deg] in the counterclockwise direction about the X axis, and the sound source 314 is located at 60 [deg] in the counterclockwise direction about the X axis.

The test is carried out with the azimuth $\psi_1$ of the search points fixed to 0 degrees while changing the azimuth $\psi_2$ to 30 degrees, 60 degrees, 90 degrees, and 120 degrees. The interpolation points between the azimuths are set every one degree and an error $\bar{e}_{[\psi_1, \psi_2]}$ from the transfer function every one degree, which is obtained by measurement, is calculated by averaging using Expression (52).

$$\bar{e}_{[\psi_1, \psi_2]} = \frac{1}{i_\psi}\sum_{i=1}^{i_\psi}\frac{1}{k_h - k_l + 1}\sum_{k=k_l}^{k_h} f_{[\psi_1,\psi_2]}(\omega_{[k]}, \hat{\psi}_{[i]}) \qquad (52)$$

In Expression (52), $f(\omega_{[k]}, \hat{\psi}_{[i]})$ represents an interpolation error of the frequency bin corresponding to the frequency $\omega_{[k]}$ at the interpolation point $\hat{\psi}_{[i]}$. In the test, $k_l$ and $k_h$ in Expression (52) are selected so that the frequency ω which is a low frequency region used in the sound source localization ranges from 500 [Hz] to 280 [Hz]. In Expression (52), $i_\psi$ represents the number of interpolation points every one degree in which is in a range larger than $\psi_1$ and smaller than $\psi_2$.

In the following test, a phase estimation error (PEE), a spectrum distortion error (SD), and a signal-to-distortion ratio (SDR) are used as an error index of $f(\omega_{[k]}, \hat{\psi}_{[i]})$.

The PEE is expressed by Expression (53) and is an index of a phase error.

$$f_{1[\psi_1,\psi_2]}(\omega, \hat{\psi}) = \sum_{m=1}^{M}\left|\frac{A_m(\omega, \hat{\psi})\hat{A}_{m[\psi_1,\psi_2]}(\omega, \hat{\psi})}{|A_m(\omega, \hat{\psi})||\hat{A}_{m[\psi_1,\psi_2]}(\omega, \hat{\psi})|} - 1\right| \qquad (53)$$

The SD is expressed by Expression (54) and is an index of an error amplitude.

$$f_{2[\psi_1,\psi_2]}(\omega, \hat{\psi}) = \sum_{m=1}^{M} \left| 20\log\frac{\hat{A}_{m[\psi_1,\psi_2]}(\omega, \hat{\psi})}{|A_m(\omega, \hat{\psi})|} \right| \quad (54)$$

The SDR is expressed by Expression (55) and is an index of an error of a transfer function itself.

$$f_{3[\psi_1,\psi_2]}(\omega, \hat{\psi}) = \sum_{m=1}^{M} \frac{|A_m(\omega, \hat{\psi}) - \hat{A}_{m[\psi_1,\psi_2]}(\omega, \hat{\psi})|^2}{|A_m(\omega, \hat{\psi})|^2} \quad (55)$$

Hereinafter, $e_1^-$, $e_2^-$, and $e_3^-$ are $e^-[\psi_1, \psi_2]$ when the PEE, the SD, and the SDR are used, respectively.

Linearity of the interpolation coefficient $D_A$ is evaluated using Expression (56).

$$\bar{d}_{[\psi_1,\psi_2]} = \frac{1}{i_\psi}\sqrt{\sum_{i=1}^{i_\psi}\left(D_{A[i]} - \frac{\hat{\psi}_{[i]} - \psi_2}{\psi_1 - \psi_2}\right)^2} \quad (56)$$

In Expression (56), the interpolation coefficient $D_{A[i]}$ is a value of $D_A$ in which the interpolation error is the minimum. In Expression (56), when the interpolation coefficient $D_A$ is close to linearity with respect to the interpolation point, it means that the interpolation coefficient $D_A$ can be determined by $(\psi^\wedge-\psi_2)/(\psi_1-\psi_2)$ and thus it is practical.

Hereinafter, $d_1^-$, $d_2^-$, and $d_3^-$ are $d^-_{[\psi_1, \psi_2]}$ when the PEE, the SD, and the SDR are used, respectively.

Figure 12:
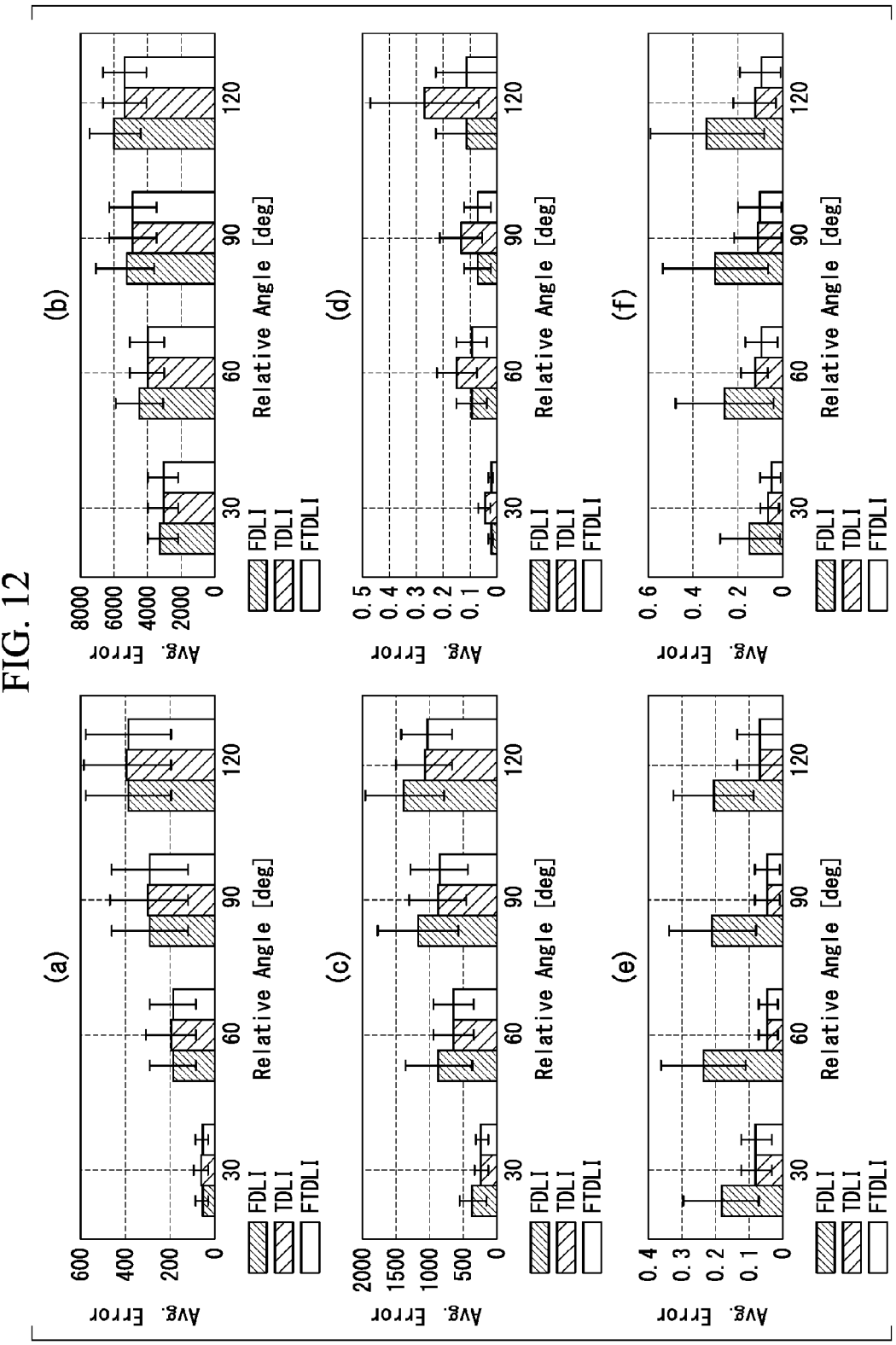
FIG. 12 is a diagram illustrating an example of a test result on linearity of an error of a transfer function and an interpolation coefficient, where a PEE, an SD, and an SDR are used while changing an azimuth $\psi_2$.

FIG. 12 is a diagram illustrating an example of a test result on linearity of the error of a transfer function and the interpolation coefficient, where a PEE, an SD, and an SDR are used while changing the azimuth $\psi_2$. FIG. 12 shows an example of a test result using the indices of three of the FDLI method, the TDLI method, and the FTDLI method.

In Parts (a) to (f) of FIG. 12, the horizontal axis represents the relative angle and the vertical axis represents the average value of errors. Part (a) of FIG. 12 shows an example of the test value of $e_1^-$, Part (b) of FIG. 12 shows an example of the test value of $e_2^-$, and Part (c) of FIG. 12 shows an example of the test value of $e_3^-$. Part (d) of FIG. 12 shows an example of the test value of $d_1^-$, Part (e) of FIG. 12 shows an example of the test value of $d_2^-$, and Part (f) of FIG. 12 shows an example of the test value of $d_3^-$.

As shown in Parts (a) to (c) of FIG. 12, when the FTDLI method of the present invention is used, the errors in all of $e_1^-$, $e_2^-$, and $e_3^-$ are smaller than those when the FDLI method and the TDLI method are used.

As shown in Parts (d) to (f) of FIG. 12, when the FTDLI method is used, the errors in linearity of $D_A$ of all of $d_1^-$, $d_2^-$, and $d_3^-$ are smaller than those when the FDLI method and the TDLI method are used. This means that $D_A$ is closest to the linearity when the FTDLI method is used.

Figure 13:
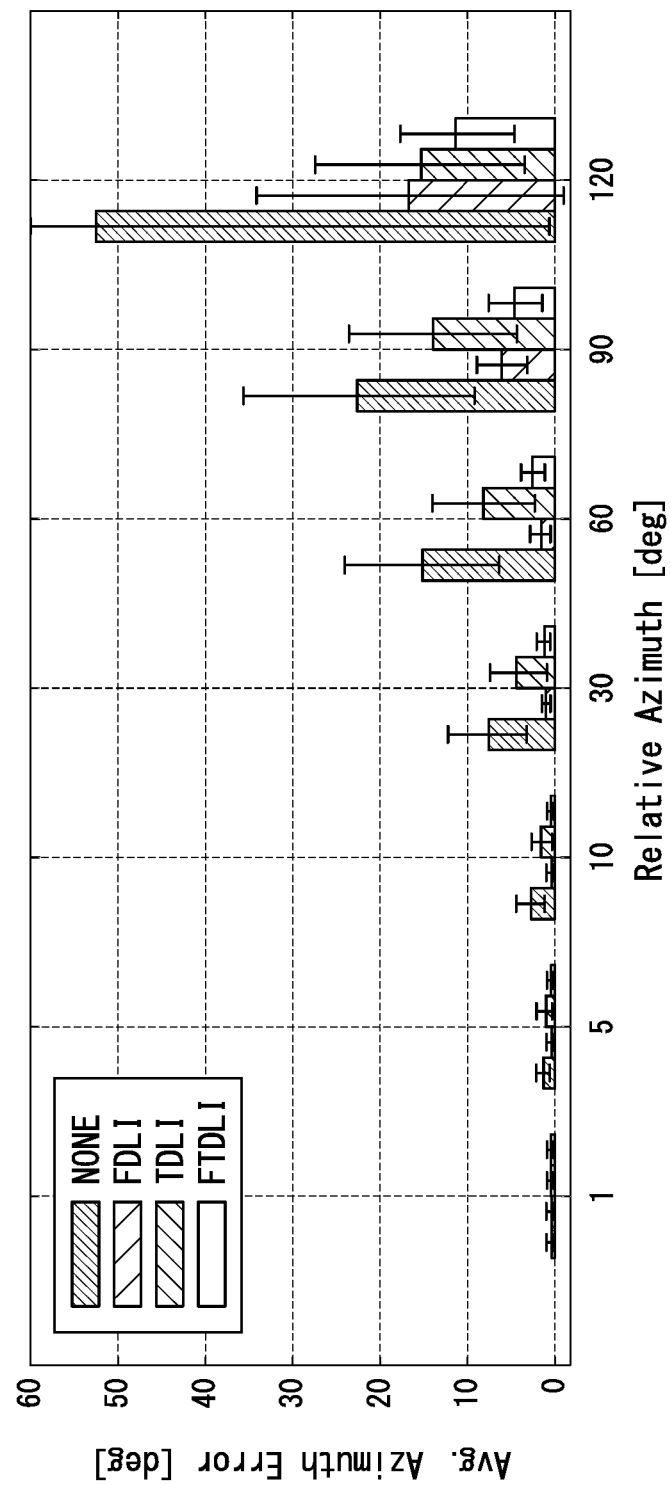
FIG. 13 is a diagram illustrating an example of an average error in estimation of an arrival direction of a sound source depending on use of interpolation.

FIG. 13 is a diagram illustrating an example of an average error in estimation of an arrival direction of a sound source depending on use of interpolation. FIG. 13 shows an example of a test result on the average error in estimation of an arrival direction when no interpolation (NONE), the FDLI method, the TDLI method, and the FTDLI method are used. In FIG. 13, the horizontal axis represents the measurement interval (relative angle) of a transfer function and the vertical axis represents the average error in estimation of an arrival direction.

The test is carried out by reproducing white noise every 1 degree (where the azimuth $\psi$ ranges from −90 degrees to 90 degrees) and calculating an error between the reproduction direction of the reproduced sound source and the estimation direction thereof. In the test, the measurement interval of the transfer function is changed so that the azimuth $\psi$ is 1 degree, 5 degrees, 10 degrees, 30 degrees, 60 degrees, 90 degrees, and 120 degrees, and the transfer functions for every 1 degree are generated by interpolation.

As shown in FIG. 13, at any relative angle, the average error when the interpolation is performed is smaller than when the interpolation is not performed. In addition, the average error when the FTDLI method is used is smaller than when no interpolation is performed or the interpolation is performed using the FDLI method or TDLI method. In this way, according to the present invention, the same degree of accuracy as estimating a sound direction using the transfer functions every 1 degree can be obtained by generating the transfer functions by interpolation between the transfer functions generated at intervals of 30 degrees and stored in advance.

An example of a test on the calculation cost due to hierarchical search will be described below.

In the test, the average processing time spent in calculation for the sound source localization (Expressions (3) to (7)) is calculated when the number of sound sources is changed and 1000 frames are processed. The number of classes to be searched for a sound source is set to 2, the first class is searched at intervals of 10 degrees, and then the second class is searched at intervals of 1 degree. The test is carried out when the number of sound sources is 1, 2, 3, and 4.

Figures 14, 15:
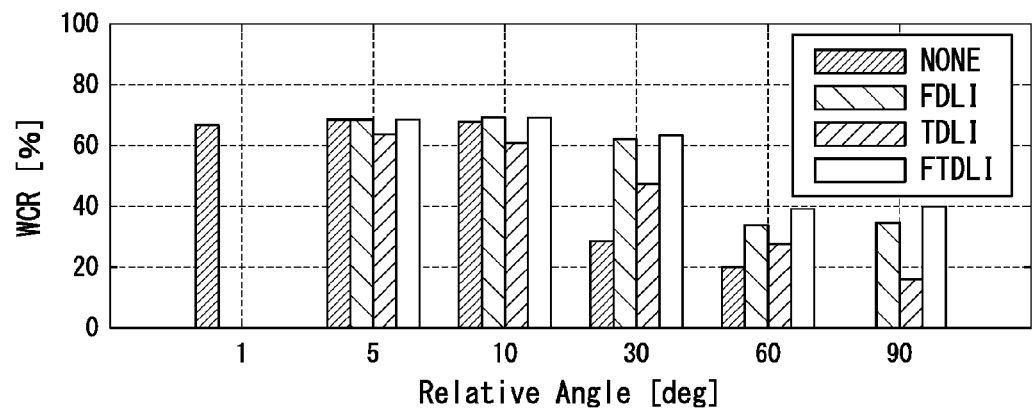
FIG. 14 is a diagram illustrating an example of a test result on a calculation cost.
FIG. 15 is a diagram illustrating an example of a speech recognition result of sound signals separated for each sound source.

FIG. 14 is a diagram illustrating an example of a test result on the calculation cost. In FIG. 14, the second stage represents a computation time when a search is performed without performing classification (non-classified), and the third stage represents a computation time when a search is performed with performing the classification (classified) according to the present invention.

As shown in FIG. 14, when the number of sound sources is 1, the computation time in the non-classified case is 24.1 [msec], and the computation time in the classified case is 6.8 [msec]. When the number of sound sources is 2, the computation time in the non-classified case is 22 [msec], and the computation time in the classified case is 7.7 [msec]. When the number of sound sources is 3, the computation time in the non-classified case is 19.6 [msec], and the computation time in the classified case is 8.3 [msec]. When the number of sound sources is 4, the computation time in the non-classified case is 17.5 [msec], and the computation time in the classified is 8.7 [msec].

In this way, even when four sound sources exist and concurrently utter speeches, the process flow ends within a frame period of 10 [msec] or less. As shown in FIG. 14, when the search is performed using the classification as in this embodiment, the average processing time is reduced to 50% or less in comparison with a case where the search is performed without using the classification, regardless of the number of sound sources. In this way, according to this embodiment, it is possible to improve processing efficiency in estimating a sound direction.

FIG. 15 is a diagram illustrating an example of a speech recognition result of sound signals separated by sound sources. In FIG. 15, the horizontal axis represents the relative angle and the vertical axis represents a word correct rate (WCR).

Speech data of 10 persons×216 words in an ATR speech database are used as speech in the test and speech concurrently uttered by four speakers are recognized. The transfer functions used in the test have the same intervals as shown in FIG. 12. The transfer functions are interpolated to estimate transfer functions with intervals of 1 degree. In the test, the WCR is evaluated when the interval of the estimated transfer functions is changed. The test is carried out using non-classified (NONE), the FDLI method, the TDLI method, and the FTDLI method, similarly to FIG. 13.

As shown in FIG. 15, when the interpolation is not used and the interval of the transfer functions is greater than 30 degrees, the recognition performance degrades. When the FTDLI method is used as the interpolation method, the recognition performance is maintained in comparison with the other interpolation methods. For example, when the transfer functions have an interval of 90 degrees, the recognition rate is improved by about 7% in comparison with the FDLI method.

As described above, when the sound direction estimation device 11 according to the first embodiment or the second embodiment is applied to the sound processing system 1, it is possible to reduce the computational load on the search while maintaining the same performance in word correct rate as in the case where the transfer functions with a finer spatial resolution of 1 degree are used. As a result, it is possible to accurately estimate a sound direction within an actual time of each frame.

The first embodiment and the second embodiment describes the example where the matrix calculation unit 106 calculates the GSVD matrix and a sound direction is estimated based on the calculated GSVD matrix, but are not limited to this example. The matrix calculation unit 106 may calculate a generalized eigenvalue decomposition (GEVD) matrix and a sound direction may be estimated based on the calculated GEVD matrix. In this case, the sound direction estimation device 11 calculates the number of classes and the search interval (granularity) with which the total search number is minimized or calculates the number of classes and the granularity in which the calculation cost is minimized, as described in the first embodiment or the second embodiment. The sound direction estimation device 11 first performs a search with a coarse search interval and then selects a next search range from the search range, based on the calculated number of classes and the calculated search interval (granularity). The sound direction estimation device 11 narrows the search interval in the selected search range. In the sound direction estimation device 11, it is possible to accurately estimate a sound direction and to reduce calculation costs.

The first embodiment and the second embodiment describe the example where the class number calculation unit 107 calculates both the number of classes used in the search and the search interval, but are not limited to this example. The number of classes may be selected in advance by a user of the device and only the search interval may be calculated.

The first embodiment and the second embodiment describe the example where the FDLI method, the TDLI method, and the TFDLI method are used as the technique of interpolating the transfer functions, but are not limited to this example. The transfer functions may be interpolated using other techniques.

Here, a program for realizing the function of the sound direction estimation device 11 in the present invention may be recorded in a computer-readable recording medium, and a computer system may read the program recorded on the recording medium and may execute the program to estimate the direction of a sound source. The term "computer system" used herein includes an OS and hardware, such as peripherals. The "computer system" also includes a WWW system including a homepage provision environment (or display environment). The "computer-readable recording medium" includes a portable medium such as a flexible disc, a magneto-optical disc, a ROM, or a CD-ROM or a storage device such as a hard disk built in the computer system. Moreover, the "computer-readable recording medium" also includes a device storing a program for a predetermined time, like an internal volatile memory (RAM) of a computer system serving as a server or a client when the programs are transmitted through a network such as the Internet or a communication line such as a telephone line.

The above programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

Although an embodiment of the invention has been described referring to the drawings, a specific configuration is not limited to those described above, and various changes in design and the like may be made within the scope without departing from the scope of the invention.

What is claimed is:

1. A sound direction estimation device comprising:
a processor; and
microphones collecting sounds from sound sources,
wherein the processor is programmed with instructions that, when executed, cause the processor to function as:
a transfer function storage unit configured to store transfer functions of the sound sources in correlation with directions of the sound sources;
a calculation unit configured to calculate a number of classes to be searched and a search interval for each class based on a desired search range and a desired spatial resolution for searching for the directions of the sound sources; and
a sound source localization unit configured to search the search range for every search interval using a transfer function, to estimate the direction of at least one of the sound sources based on a search result, to update the search range and the search interval based on the estimated direction of the sound source until the number of classes calculated by the calculation unit is reached, and to estimate the direction of at least one of the sound sources,
wherein the sound source localization unit is configured
to determine whether the transfer function corresponding to an azimuth of the search interval is stored in the transfer function storage unit,
to read the transfer function corresponding to the azimuth of the search interval from the transfer function storage unit when it is determined that the transfer function corresponding to the azimuth of the search interval is stored in the transfer function storage unit, to calculate an interpolated transfer function by interpolating the transfer function corresponding to the azimuth of the search interval by a Frequency Time Domain Linear or a Bi-linear Interpolation method when it is determined that the transfer function corresponding to the azimuth of the search interval is not stored in the transfer function storage unit, and to estimate the directions of the sound sources using the read transfer function or the calculated interpolated transfer function, wherein the Frequency Time Domain Linear or the Bi-linear Interpolation method comprises calculating the interpolated transfer function with a Frequency Domain Linear or the Bi-linear Interpolation method and a Time Domain Linear Interpolation method, wherein the Frequency Time Domain Linear or the Bi-linear Interpolation method further comprises:

decomposing the calculated interpolation transfer function with the Frequency Domain Linear or the Bi-linear Interpolation method into a phase expression and an amplitude expression based on the Frequency Domain Linear or the Bi-linear Interpolation method; and decomposing the calculated interpolation transfer function with the Time Domain Linear Interpolation method into another phase expression and another amplitude expression based on the Time Domain Linear Interpolation method, wherein the Frequency Time Domain Linear or the Bi-linear Interpolation method further comprises combining the phase expression decomposed based on the Frequency Domain Linear or Bi-linear Interpolation method with the another amplitude expression decomposed based on the Time Domain Linear Interpolation method, and wherein the calculation unit is configured to calculate the number of classes (S) according to a following expression:

$$S = \log \frac{d_0}{d_s},$$

where $d_0$ represents the search range, $d_s$ represented the search interval of a given class s, and s is an integer representing the given class with a value between 1 and S, and wherein the search interval $d_s$ of the given class s is determined using the following expression:

$$d_s = \sqrt[s]{d_0^{S-s} d_S^s} = d_0^{\frac{S-s}{S}} d_S^{\frac{s}{S}},$$

so that a search number for each class is constant in all of the classes and a total search number in all the classes is minimized.

2. The sound direction estimation device according to claim 1, wherein the sound source localization unit is configured to search an n-th class (where n is an integer greater than or equal to 1) in a predetermined search range with the calculated search interval and update at least one search interval in the search range to a search range of an (n+1)-th class based on the search result, to update a search interval of the (n+1)-th class to be searched based on the updated search range of the (n+1)-th class and the desired spatial resolution, and to update and estimate the directions of the sound sources using the updated search range of the (n+1)-th class, the updated search interval of the (n+1)-th class, and the transfer function corresponding to an azimuth of the search interval until the number of classes (n+1) reaches the number of classes calculated by the calculation unit.

3. The sound direction estimation device according to claim 1, wherein the calculation unit is configured to calculate the number of classes (S) according to the following expression:

$$S = \log\left(\frac{d_0}{d_s} \prod_{i=1}^{S}(C_i)\right),$$

where $C_i$ represented a calculation cost of an a given i-th class, and i is an integer representing the given class with a value between 1 and S, and the search interval $d_s$ according to the following expression:

$$d_s = d_0^{\frac{S-s}{S}} d_S^{\frac{s}{S}} \prod_{i=1}^{S}(C_i^{\frac{S-s}{s}}) \prod_{i=S}^{S+1}\left(\frac{1}{C_i}\right),$$

so as to minimize the calculation cost which is a sum of a search cost spent in calculating the search number in the search range and an interpolation cost spent in the interpolation.

4. A sound direction estimation method in a sound direction estimation device, comprising:

calculating a number of classes to be searched and a search interval for each class based on a desired search range and a desired spatial resolution for searching for a direction of a sound source;

searching the search range for every search interval using transfer functions from the sound source stored in a transfer function storage unit in correlation with the direction of the sound source and estimating the direction of the sound source based on a search result;

updating the search range and a search interval based on the estimated direction of the sound source until the calculated number of classes calculation unit is reached and estimating the direction of the sound source;

determining whether a transfer function corresponding to an azimuth of the search interval is stored in the transfer function storage unit, reading the transfer function corresponding to the azimuth of the search interval from the transfer function storage unit when it is determined that the transfer function corresponding to the azimuth of the search interval is stored in the transfer function storage unit, calculating an interpolated transfer function by interpolating the transfer function corresponding to the azimuth of the search interval by a Frequency Time Domain Linear or a Bi-linear Interpolation method when it is determined that the transfer function corresponding to the azimuth of the search interval is not stored in the transfer function storage unit, and estimating the directions of the sound sources using the read transfer function or the calculated interpolated transfer function, wherein the Frequency Time Domain Linear or the Bi-linear Interpolation method comprises calculating the interpolated transfer function with a Frequency Domain Linear or the Bi-linear Interpolation method and a Time Domain Linear Interpolation method, wherein the Frequency Time Domain Linear or the Bi-linear Interpolation method further comprises:

decomposing the calculated interpolation transfer function with the Frequency Domain Linear or the Bi-linear Interpolation method into a phase expression and an amplitude expression based on the Frequency Domain Linear or the Bi-linear Interpolation method; and decomposing the calculated interpolation transfer function with the Time Domain Linear Interpolation method into another phase expression and another amplitude expression based on the Time Domain Linear Interpolation method, and wherein the Frequency Time Domain Linear or the Bi-linear Interpolation method further comprises combining the phase expression decomposed based on the Frequency Domain Linear or Bi-linear Interpolation method with the another amplitude expression decomposed based on the Time Domain Linear Interpolation method, and wherein the calculation unit is configured to calculate the number of classes (S) according to a following expression:

$$S = \log \frac{d_0}{d_s},$$

where $d_0$ represents the search range, $d_s$ represented the search interval of a given class s, and s is an integer representing the given class with a value between 1 and S, and wherein the search interval $d_s$ of the given class s is determined using the following expression:

$$d_s = \sqrt[s]{d_0^{S-s} d_S^s} = d_0^{\frac{S-s}{S}} d_S^{\frac{s}{S}},$$

so that a search number for each class is constant in all of the classes and a total search number in all the classes is minimized.

5. A non-transitory computer readable medium storing a sound direction estimation program that causes a computer of a sound direction estimation device to perform:

calculating a number of classes to be searched and a search interval for each class based on a desired search range and a desired spatial resolution for searching for a direction of a sound source;

searching the search range for every search interval using transfer functions from the sound source stored in a transfer function storage unit in correlation with the direction of the sound source and estimating the direction of the sound source based on a search result;

updating the search range and a search interval based on the estimated direction of the sound source until the calculated number of classes calculation unit is reached and estimating the direction of the sound source;

determining whether a transfer function corresponding to an azimuth of the search interval is stored in the transfer function storage unit, reading the transfer function corresponding to the azimuth of the search interval from the transfer function storage unit when it is determined that the transfer function corresponding to the azimuth of the search interval is stored in the transfer function storage unit, calculating an interpolated transfer function by interpolating the transfer function corresponding to the azimuth of the search interval by a Frequency Time Domain Linear or Bi-linear Interpolation method when it is determined that the transfer function corresponding to the azimuth of the search interval is not stored in the transfer function storage unit, and estimating the directions of the sound sources using the read transfer function or the calculated interpolated transfer function, wherein the Frequency Time Domain Linear or the Bi-linear Interpolation method comprises calculating the interpolated transfer function with a Frequency Domain Linear or the Bi-linear Interpolation method and a Time Domain Linear Interpolation method, wherein the Frequency Time Domain Linear or the Bi-linear Interpolation method further comprises:

decomposing the calculated interpolation transfer function with the Frequency Domain Linear or the Bi-linear Interpolation method into a phase expression and an amplitude expression based on the Frequency Domain Linear or the Bi-linear Interpolation method; and decomposing the calculated interpolation transfer function with the Time Domain Linear Interpolation method into another phase expression and another amplitude expression based on the Time Domain Linear Interpolation method, and wherein the Frequency Time Domain Linear or the Bi-linear Interpolation method further comprises combining the phase expression decomposed based on the Frequency Domain Linear or Bi-linear Interpolation method with the another amplitude expression decomposed based on the Time Domain Linear Interpolation method, and wherein the calculation unit is configured to calculate the number of classes (S) according to a following expression:

$$S = \log \frac{d_0}{d_s},$$

where $d_0$ represents the search range, $d_s$ represented the search interval of a given class s, and s is an integer representing the given class with a value between 1 and S, and wherein the search interval $d_s$ of the given class s is determined using the following expression:

$$d_s = \sqrt[s]{d_0^{S-s} d_S^s} = d_0^{\frac{S-s}{S}} d_S^{\frac{s}{S}},$$

so that a search number for each class is constant in all of the classes and a total search number in all the classes is minimized.

* * * * *